US009597602B2

(12) United States Patent
Shimohata et al.

(10) Patent No.: US 9,597,602 B2
(45) Date of Patent: Mar. 21, 2017

(54) INFORMATION PROCESSING SYSTEM, INFORMATION PROCESSING DEVICE, STORAGE MEDIUM STORING INFORMATION PROCESSING PROGRAM, INFORMATION PROCESSING METHOD, AND STORAGE DEVICE

(71) Applicant: NINTENDO CO., LTD., Kyoto (JP)

(72) Inventors: Yasuyuki Shimohata, Kyoto (JP); Kimiharu Hyodo, Kyoto (JP); Ryuichi Yoshida, Kyoto (JP); Goro Abe, Kyoto (JP); Yusuke Yamasoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 170 days.

(21) Appl. No.: 14/471,291

(22) Filed: Aug. 28, 2014

(65) Prior Publication Data

US 2015/0314202 A1    Nov. 5, 2015

(30) Foreign Application Priority Data

May 2, 2014   (JP) ................................. 2014-095029
May 29, 2014  (JP) ................................. 2014-110879

(51) Int. Cl.
*G06F 17/00* (2006.01)
*A63F 13/95* (2014.01)
(Continued)

(52) U.S. Cl.
CPC .............. *A63F 13/95* (2014.09); *A63F 13/98* (2014.09); *G06F 21/62* (2013.01); *G06F 21/78* (2013.01);
(Continued)

(58) Field of Classification Search
USPC ..................................................... 463/30–33
See application file for complete search history.

(56) References Cited

U.S. PATENT DOCUMENTS 5,255,387 A   10/1993   Arnold et al.
6,256,714 B1   7/2001   Sampsell et al.
(Continued)

FOREIGN PATENT DOCUMENTS

JP        4-229355 A     8/1992
JP        2000-163524    6/2000
(Continued)

OTHER PUBLICATIONS

Extended European Search Report (6 pgs.) dated May 22, 2015 issued in corresponding European Application No. 14182103.3.
(Continued)

*Primary Examiner* — Ronald Laneau
(74) *Attorney, Agent, or Firm* — Nixon & Vanderhye P.C.

(57) ABSTRACT

An example of information processing system includes a storage device; and an information processing device for performing near field communication with the storage device. The storage device has an external appearance representing, three-dimensionally or two-dimensionally, an object that appears in a virtual space generated by execution of a predetermined application program by the information processing device. The storage device stores object information on the object. The information processing device writes, to the storage device, character image information specifying an image of a character created based on an instruction of a user. The information processing device executes a predetermined process using at least one of the object information and the character image information read from the storage device.

14 Claims, 18 Drawing Sheets

(51) Int. Cl.
  H04B 5/00   (2006.01)
  H04W 4/00   (2009.01)
  G06F 21/62  (2013.01)
  G06F 21/78  (2013.01)
  A63F 13/98  (2014.01)
  H04L 29/06  (2006.01)

(52) U.S. Cl.
  CPC ........... *H04B 5/0031* (2013.01); *H04L 67/38* (2013.01); *H04W 4/003* (2013.01); *H04W 4/008* (2013.01); *G06F 2221/2109* (2013.01)

(56) References Cited

U.S. PATENT DOCUMENTS

| | | | |
|---|---|---|---|
| 7,731,590 B2 | 6/2010 | Azuma | |
| 8,702,514 B2* | 4/2014 | Ashida | A63F 13/06 463/39 |
| 9,039,532 B2 | 5/2015 | Canessa | |
| 9,072,964 B2 | 7/2015 | Nakada et al. | |
| 2002/0095663 A1 | 7/2002 | Joory | |
| 2003/0093575 A1 | 5/2003 | Upton | |
| 2003/0220876 A1 | 11/2003 | Burger | |
| 2004/0046643 A1 | 3/2004 | Becker | |
| 2004/0089707 A1 | 5/2004 | Cortina | |
| 2004/0194112 A1 | 9/2004 | Whittenberger et al. | |
| 2006/0156036 A1 | 7/2006 | Oh et al. | |
| 2006/0175753 A1 | 8/2006 | MacIver et al. | |
| 2007/0069852 A1 | 3/2007 | Mo et al. | |
| 2008/0058102 A1 | 3/2008 | Hato | |
| 2008/0290994 A1 | 11/2008 | Bruns | |
| 2009/0055597 A1 | 2/2009 | Robles | |
| 2009/0236416 A1 | 9/2009 | Morita | |
| 2009/0258712 A1 | 10/2009 | Tanaka | |
| 2010/0087181 A1 | 4/2010 | Chen et al. | |
| 2010/0115170 A1 | 5/2010 | Jeong | |
| 2010/0190555 A1 | 7/2010 | Dutilly et al. | |
| 2010/0229108 A1* | 9/2010 | Gerson | A63F 13/77 715/757 |
| 2011/0009075 A1 | 1/2011 | Jantunen | |
| 2011/0098092 A1 | 4/2011 | Reiche, III | |
| 2011/0148588 A1 | 6/2011 | Bacquet | |
| 2012/0046106 A1* | 2/2012 | Ito | A63F 13/06 463/37 |
| 2012/0206242 A1 | 8/2012 | Cho | |
| 2012/0206391 A1 | 8/2012 | Kim et al. | |
| 2012/0258796 A1* | 10/2012 | Ohta | G06T 19/00 463/32 |
| 2012/0309523 A1* | 12/2012 | Yamashita | A63F 13/10 463/31 |
| 2014/0025513 A1 | 1/2014 | Cooke et al. | |
| 2014/0191947 A1 | 7/2014 | Sharma | |

FOREIGN PATENT DOCUMENTS

| | | |
|---|---|---|
| JP | 2003-135848 | 5/2003 |
| JP | 2004-192447 A | 7/2004 |
| JP | 2006-277403 A | 10/2006 |
| JP | 2007-190203 A | 8/2007 |
| JP | 2008-79664 | 4/2008 |
| JP | 2008-183066 A | 8/2008 |

OTHER PUBLICATIONS

Co-pending U.S. Appl. No. 14/856,605, filed Sep. 17, 2015.
Office Action (16 pgs.) dated Jan. 20, 2015 issued in co-pending U.S. Appl. No. 13/961,007.
Office Action (35 pgs.) dated Sep. 11, 2015 issued in co-pending U.S. Appl. No. 13/961,007.
U.S. Appl. No. 14/471,325, filed Aug. 28, 2014.
Office Action dated Oct. 2, 2015 issued in corresponding Japanese Application No. 2014-223267 (6 pgs.).
Shimohata, et al., Office Action (13 pages) dated Feb. 11, 2016 issued in co-pending U.S. Appl. No. 14/856,605.
Shimohata, et al., Office Action (10 pages) dated Feb. 29, 2016 issued in co-pending U.S. Appl. No. 14/471,325.
Communication pursuant to Article 94(3) EPC dated Oct. 17, 2016, issued in corresponding European Patent Application No. 15165469.6.
Office Action dated Nov. 23, 2016, issued in related U.S. Appl. No. 15/229,792.
Skylanders, https://web.archive.org/web/20120423224035/http://www.skylanders.com/ (2012), 3 pages.
Office Action dated Dec. 13, 2016, issued in related U.S. Appl. No. 14/701,938.

* cited by examiner

INFORMATION PROCESSING SYSTEM, INFORMATION PROCESSING DEVICE, STORAGE MEDIUM STORING INFORMATION PROCESSING PROGRAM, INFORMATION PROCESSING METHOD, AND STORAGE DEVICE

CROSS REFERENCE TO RELATED APPLICATION

The disclosures of Japanese Patent Application No. 2014-95029 filed on May 2, 2014 and Japanese Patent Application No. 2014-110879 filed on May 29, 2014 are incorporated herein by reference.

FIELD

The technology herein relates to an information processing system, an information processing device, a storage medium storing an information processing program, an information processing method and a storage device for performing near field communication.

BACKGROUND AND SUMMARY

Conventionally, there is a technology for performing communication between devices using near field communication such as NFC. By near field communication, communication between an information processing device and a storage device (so-called tag) starts in response to the storage device approaching the information processing device.

Conventionally, a storage device that is communicable with an information processing device by near field communication is merely used in a specific application program executed by the information processing device, and there has been room for improvement regarding the versatility of such a storage device.

Accordingly, this application discloses an information processing system, an information processing device, a storage medium storing an information processing program, and an information processing method, with which a storage device is usable in a more versatile manner, and such a storage device.

(1)
An example of information processing system described in this specification is an information processing system including a storage device; and an information processing device for performing near field communication with the storage device.

The storage device has an external appearance representing, three-dimensionally or two-dimensionally, an object that appears in a virtual space generated by execution of a predetermined application program by the information processing device. The storage device also stores object information on the object.

The information processing device includes a character write unit and a first process execution unit. The character write unit writes, to the storage device, character image information specifying an image of a character created based on an instruction of a user. The first process execution unit executes a predetermined process using at least one of the object information and the character image information read from the storage device.

(2)
The first process execution unit may execute, as the predetermined process, a process of displaying at least a part of the object and at least a part of the character on a display unit in the state where the part of the object and the part of the character are associated with each other.

(3)
The object information may be stored on a storage unit in advance at the time of production of the storage device.

(4)
The object may be a player character to be operated by the user. The character may correspond to the user that operates the player character.

(5)
The character write unit may write, to the storage device, information specifying an image of an avatar of the user as the character image information.

(6)
The information specifying the image of the avatar may be information specifying an image of each of parts included in the avatar.

(7)
The storage device may store identification information on the object as the object information.

(8)
The first process execution unit may execute the predetermined application program to execute, as the predetermined process, an appearance process of causing the object that appears in the virtual space using the object information read from the storage device.

(9)
The information processing device may further include a second process execution unit for executing another application program different from the predetermined application program to further execute a process of causing the character to appear in the virtual space using the character image information read from the storage device.

(10)
Another example of information processing system described in this specification is an information processing system including a storage device; and an information processing device for performing near field communication with the storage device.

The storage device has an external appearance representing, three-dimensionally or two-dimensionally, an object that appears in a virtual space generated by execution of a predetermined application program by the information processing device. The storage device also stores object information on the object and user information on a user.

The information processing device includes a display control unit for displaying the object and information representing the user corresponding to the object on a display unit in the state where the object and the information representing the user are associated with each other using the object information and the user information read from the storage device.

(11)
The object may be a player character in a game application which is the predetermined application. The display control unit may display, on the display unit, the player character and information representing the user that operates the player character in the state where the player character and the information representing the user are associated with each other.

(12)
The user information may be information specifying a character that is different from the object and corresponds to the user. The information processing device may further include a process execution unit for executing another application program different from the predetermined application program to cause a character specified by the user information read from the storage device to appear in the virtual space.

(13)

Still another example of information processing system described in this specification is an information processing system including a storage device; and an information processing device for performing near field communication with the storage device.

The storage device has an external appearance representing, three-dimensionally or two-dimensionally, a general appearance of a first character appearing in a virtual space generated by execution of a predetermined application program by the information processing device. The storage device also stores character information on the first character.

The information processing device includes a character write unit and a first process execution unit. The character write unit writes, to the storage device, character image information specifying an image of a second character created based on an instruction of a user. The first process execution unit executes a predetermined process using at least one of the character information and the character image information read from the storage device.

The first character and the second character may be the same character (e.g., avatar in the embodiment described later) or different characters.

This specification discloses an information processing device or a storage device included in the information processing system according to (1) through (13), and also discloses a non-transitory computer-readable storage medium storing an information processing program which causes a computer of the information processing device to function as each of units of the information processing device. The information processing device may have a structure including the character write unit but not including the first process execution unit. The information processing program may be an information processing program causing the computer of the information processing device to function as a character write unit (but not as the first process execution unit). This specification discloses an information processing method executable by the information processing system.

According to an information processing system, an information processing device, a storage medium storing an information processing program, an information processing method and a storage device described above, the storage device performing near field communication can be used in a more versatile manner.

These and other objects, features, aspects and advantages will become more apparent from the following detailed description when taken in conjunction with the accompanying drawings.

DETAILED DESCRIPTION OF NON-LIMITING EXAMPLE EMBODIMENTS

1. Structure of the Information System

Figure 1:
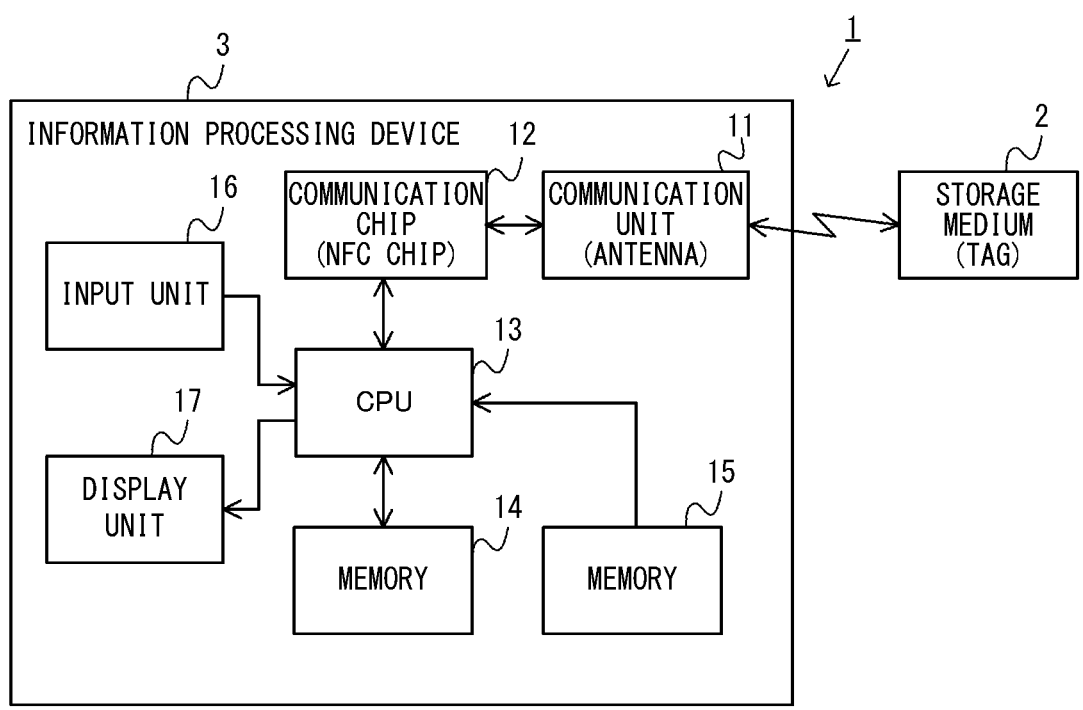
FIG. 1 shows a structure of an example of information processing system according to the example embodiment.

Hereinafter, an information processing system, an information processing device, a storage medium storing an information processing program, an information processing method, and a storage device according to an example of the example embodiment will be described. First, a structure of an information processing system will be described. FIG. 1 shows a structure of an example of information processing system in the example embodiment. As shown in FIG. 1, an information processing system 1 includes a storage device (tag) 2 and an information processing device 3. The information processing device 3 is an optional information processing device capable of performing near field communication with the tag 2.

In the example embodiment, a case in which communication based on the NFC standards is performed between the information processing device 3 and the tag 2 will be described as an example of near field communication. Herein, "near field communication" refers to a communication system by which radio waves (e.g., electromagnetic induction) from one device generates an electromotive force in the other device. The other device is operable by the generated electromagnetic force (the other device may or may not have a power source).

In the near field communication, the information processing device 3 and the tag 2 become communicable with each other when approaching each other (typically, when the distance therebetween becomes several ten centimeters or shorter). In the near field communication, radio waves are kept transmitted while the communication between two communication devices are established (i.e., while one of the communication devices (tag) is close to the other communication device).

The information processing device 3 is an optional information processing device capable of performing near field communication. In the example embodiment, the information processing device 3 may be, for example, a mobile (also referred to as "portable") device such as a mobile game device, a mobile phone, a smart phone or the like; an installation type device such as a personal computer, a home-use game device or the like; or a large-scale device such as a commercial-use arcade game device or the like. For example, the information processing device 3 is a mobile device having an NFC reader/writer function.

The tag 2 is an optional device capable of performing near field communication with the information processing device 3. In the example embodiment, the tag 2 is a storage device having an NFC tag function. Namely, the tag 2 includes a circuit (IC chip) for performing near field communication and a storage unit (memory, etc.) storing data. The tag 2 is not limited to a device having only a function of storing data, and may be an information processing device (mobile device) having an NFC card emulation function.

Hereinafter, a structure of the information processing device 3 will be described. As shown in FIG. 1, the information processing device 3 includes a communication unit 11. The communication unit 11 is an antenna usable for near field communication. The information processing device 3 also includes a communication chip 12. The communication chip 12 generates a signal (radio wave) to be transmitted from the communication unit 11 in conformity to an instruction from a CPU 13 (described later). The generated signal is transmitted from the communication unit 11. The communication chip 12 is, for example, an NFC chip.

As shown in FIG. 1, the information processing device 3 includes the CPU 13 and a memory 14. The CPU 13 is an information processing unit for executing various types of information processes to be executed by the information processing device 3. The CPU 13 executes the above-described various types of information processes by use of the memory 14.

The information processing device 3 includes a program storage unit 15. The program storage unit 15 stores various programs (including a communication program and an application program described later) to be executed by the information processing device 3. The program storage device 15 is an optional storage device (storage medium) accessible by the CPU 13. The program storage unit 15 may be a storage unit built in the information processing device 3 such as, for example, a hard disc or a memory; a storage medium detachable from the information processing device 3 such as, for example, an optical disc or a cartridge; or both of such a storage unit and such a storage medium.

In the example embodiment, in the information processing device 3, at least two types of programs, namely, an application program and a communication program, are stored on the storage unit 15. The application program is a program for executing an optional application of performing data communication with the tag 2. The application program may be, for example, a game program of reading game data from the tag 2 and performing a game process by use of the game data. The communication program is a program for performing near field communication with the tag 2. The communication program may be, for example, firmware for causing the communication chip 12 to operate, and may be prepared in the information processing process 3 as a library in advance. As described later in detail, the communication program receives an instruction from the application and causes the communication chip 12 to perform an operation for communication. In the case where the information processing device 3 is capable of executing a plurality of application programs, the communication program is shared by the plurality of applications. Namely, the communication program (communication control unit 32 described later) can accept an instruction on communication from a plurality of applications.

The information processing device 3 also includes an input unit 16 for accepting an instruction from a user such as a button, a touch panel or the like. The information processing device 3 further includes a display unit 17 for displaying an image generated by an information process as described above.

The information processing device 3 may include a plurality of devices. For example, the information processing device 3 may include a device including the CPU 13 and the memory 14 and a device including the communication unit 11 and the communication chip 12, and the latter device may be detachably connected to the former device. The information processing device 3 may include a main body device including the CPU 13 and a separate device including the input unit 16 and/or the display unit 17. For example, in another embodiment, the information processing device 3 may include a main body device and a terminal device including the input unit 16 and the display unit 17. Alternatively, the information processing device may include a main body device and an operation device including the input unit 16. Still alternatively, the information processing device 3 may not include the display unit 17 and may use a TV as a display device.

In another embodiment, at least a part of the information process to be executed by the information processing device 3 may be executed in a distributed manner by a plurality of devices communicable with each other via a network (wide area network and/or local area network).

Figure 2:
FIG. 2 shows an example of external appearance of a tag.

FIG. 2 shows an example of external appearance of the tag 2. As shown in FIG. 2, the tag 2 in the example embodiment is a figure-type tag having an external appearance representing a character. The character represented by the tag 2 is a character appearing in a specific application (e.g., game) executable by the information processing device 3. A user can use the tag 2 to cause the character to appear in the specific application. Namely, when executing the program of the specific application, the information processing device 3 uses the data stored on the tag 2 to cause the above-described character to appear in a virtual space generated by the program of the specific application. The figure-type tag 2 represents an optional object that appears in the application. The figure-type tag 2 is not limited to representing a character, and may represent an item in the game application.

As described above, the tag 2 is used in a specific application program. As described later in detail, the tag 2 can store data usable only in a specific application program (dedicated data described later). Hereinafter, such a specific application program will be referred to as a "specific application program". There may be one type of specific application program or a plurality of types of specific application programs corresponding to one type of tag. In the case where, for example, a plurality of types of applications are provided for one series, the plurality of types of applications may be specific application programs.

As described later in detail, the tag 2 is usable in a specific application program and also is usable in another application program. Namely, the tag 2 stores data usable only in a specific application program and also store data usable in another application program. Hereinafter, an example of data stored on the tag 2 will be described.

Figure 3:
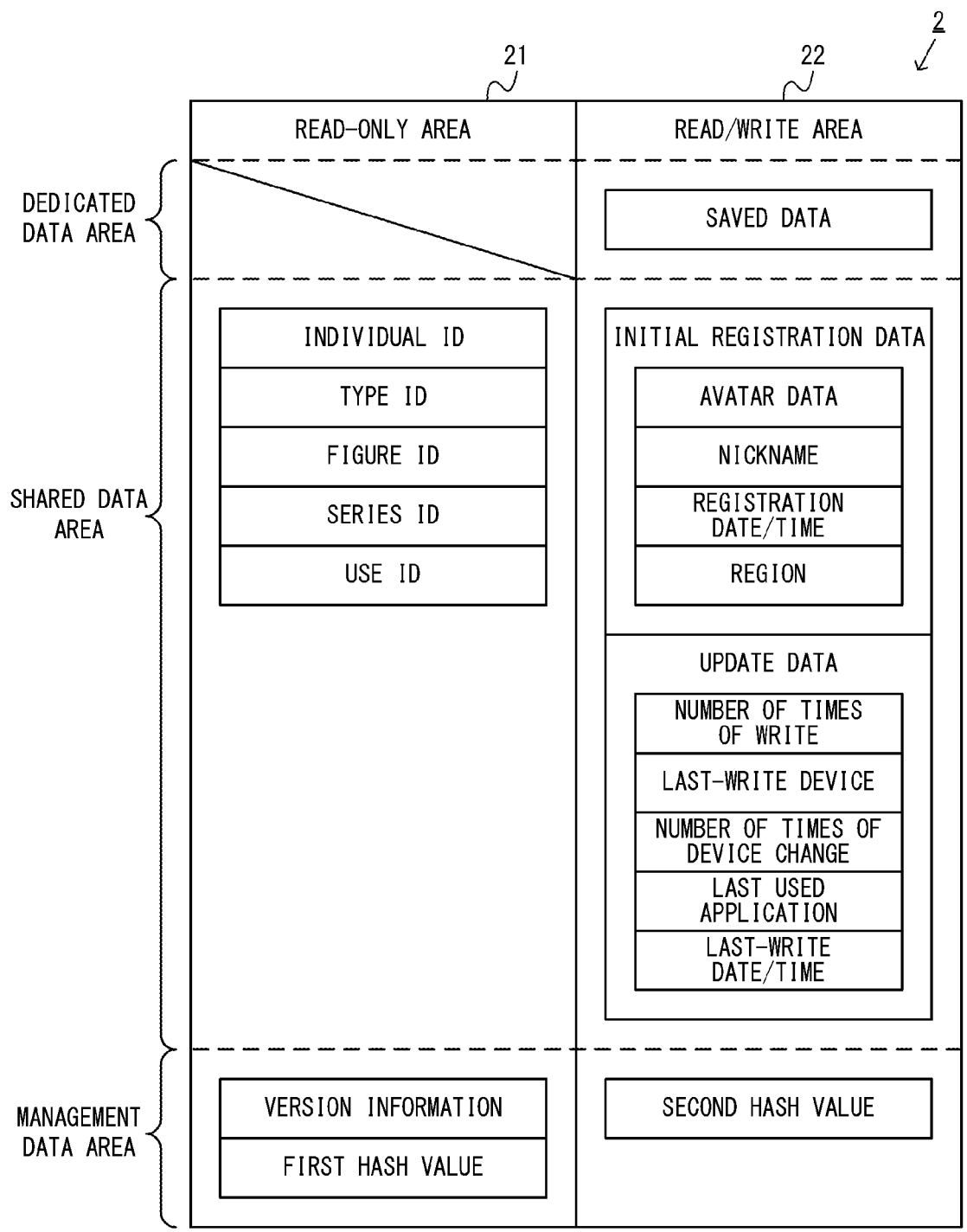
FIG. 3 shows an example of data stored on the tag.

FIG. 3 shows an example of data stored on the tag 2. In the example embodiment, as shown in FIG. 3, the tag 2 includes a read-only area 21 and a read/write area 22. The read-only area 21 is a storage area that only allows data stored thereon to be read. The read/write area 22 is a storage area that allows data stored thereon to be read and also allows data to be written thereto. Data is stored in the read-only area 21 during the production of the tag 2, and after that (after the tag 2 is shipped), data write to the read-only area 21 is prohibited. Namely, the information processing device 3 (application program to be executed by the information processing device 3) cannot write data to the read-only area 21. By contrast, the information processing device 3 (application program to be executed by the information processing device 3) can read and write from and to the read/write area 22. At the time of shipping of the tag 2, data may or may not be stored in the read/write area 22. In either case, when the tag 2 and the information processing device 3 communicate with each other, data is written to the read/write area 22 by the information processing device 3 and stored therein.

In the example embodiment, roughly three types of data, namely, dedicated data, shared data and management data, are stored on the tag 2. As shown in FIG. 3, in the example embodiment, storage areas in which respective types of data are stored (dedicated data area, shared data area and management data area) are predefined. In another embodiment, such storage areas may not be predefined.

The dedicated data is data usable only in a specific application program as described above. In the example embodiment, the dedicated data includes saved data of the specific application program (see FIG. 3). Data stored as saved data includes, for example, data representing a parameter on the character represented by the tag 2, data representing how the game of the specific application program is progressing, and/or data on a player of the game of the specific application program. In the example embodiment, the dedicated data is stored in the read/write area 22 and is not stored in the read-only area 21 (see FIG. 3).

Now, the shared data will be described. The shared data is data usable in a specific application program and also an application program that is not a specific application program. In the example embodiment, the shared data is stored in both of the read-only area 21 ands the read/write area 22. The tag 2 may store the shared data in only either one of the read-only area 21 ands the read/write area 22.

On the read-only area 21, at least the following data (information) is stored as the shared data.
Individual ID (data representing the individual ID)
Type ID (data representing the type ID)
Figure ID (data representing the figure ID)
Series ID (data representing the series ID)
Use ID (data representing the use ID)

The individual ID is identification information specific to the tag. An NFC tag such as the tag 2 in the example embodiment stores identification information specific to the tag that is called a UID (Unique ID). The individual ID is different from the UID. The individual ID is an ID that is different from the UID and is assigned so that a provider of a service using the tag can manage the tag easily.

The figure ID is identification information specific to the external appearance (shape, color) of the figure-type tag 2. The figure ID is identification information that allows the type of the figure of the tag 2 to be uniquely specified. In the case where, for example, there are a plurality of tags having different external appearances (e.g., different poses or clothes) for one character, each tag is assigned a figure ID of a different value. In this case, the figure ID may include an ID specific to the character and also an ID representing a pose, clothes or the like of the corresponding tag.

An application program executable by the information processing device 3 includes a figure ID of a tag to be used (usable) by the application program itself. As described later in detail, in the case where the value of the figure ID included in the application program matches the value of the figure ID stored on the tag, the application program can use the dedicated data stored on the tag. Namely, the figure ID can be considered as identification information for managing the use of the dedicated data stored on the tag 2.

The series ID is identification information specific to a group to which the object (character) represented by the tag 2 belongs. In the case where, for example, the character represented by the tag 2 appears in a plurality of types of applications (e.g., a series of game applications), the plurality of types of applications may be set as one group, and a series ID representing the group may be set.

The type ID is identification information that represents the type of the tag 2. In the example embodiment, the information processing device 3 can use a card-type tag as well as a figure-type tag such as the tag 2. The tag ID is identification information that represents whether the tag is a figure-type tag or a card-type tag. In another embodiment, the type of tag identified by the type ID is optional. For example, each of tag providers may be assigned a different type ID.

The use ID is identification information that specifies an application program that can use the dedicated data (described later in detail) stored on the tag 2 (i.e., specifies the above-described specific application program). Herein, an application program executable by the information processing device 3 is assigned a use ID. In the example embodiment, the figure ID is used to manage the use of the dedicated data stored on the tag 2 (see a specific application/non-specific application determination process described later). In another embodiment, a use ID may be used to manage the use of the dedicated data stored on the tag 2.

As shown in FIG. 3, in the read/write data 22, initial registration data and update data are stored as the shared data. The content of the shared data stored on the tag 2 is optional. For example, in another embodiment, the tag 2 may store only either one of the initial registration data and the update data as the shared data.

The initial registration data is data registered by the user at the start of the use of the tag 2 by the information processing device 3. The initial registration data is typically stored on the tag 2 at the timing when the tag 2 is first used, but may be stored on the tag 2 at an optional timing. Namely, the user 2 may register the tag 2 at an optional timing.

In the example embodiment, the initial registration data includes the following data.
Avatar data
Nickname (data representing the nickname)
Registration date/time (data representing the registration date/time)
Region (data representing the region)

The avatar data is data on an avatar of the user. The avatar data includes data usable by the information processing device 3 to generate an avatar and display the avatar on the display unit 17. Specifically, the avatar data includes data representing each of parts of the avatar (shapes of the eye, nose and the like, body shape, etc.). In the example embodiment, the information processing device 3 stores a program for generating an avatar by use of the avatar data. In the example embodiment, the program for generating an avatar is stored in advance as a system program or a library of the information processing device 3. The avatar can be displayed in each of the application programs (by use of the avatar generation program).

In the example embodiment, the information processing device 3 stores a plurality of types of part data (image data or three-dimensional model data) for each of parts of the avatar in advance (the part data may be included in the avatar generation program). The plurality of types of part data are each assigned a number, and the avatar data represents such a number assigned to the part data of each part included in the avatar. The information processing device 3 executes the avatar generation program and thus is made capable of generating an avatar by use of the part data having a number represented by the avatar data. As can be seen, in the example embodiment, an image is generated by a different method (process) for the avatar stored on the tag 2 from for the character represented by the tag 2.

The nickname is a nickname given to the tag 2 by the user. In the case where, for example, one user possesses two or more tags having the same external appearance, the user can give different nicknames to the tags so as to distinguish the tags.

As described later in detail, at the time when an initial registration process is executed on the tag (see FIG. 7 and FIG. 8 described later), the information processing device 3 causes the user to input the avatar data and the nickname. The input data and data on the registration date/time and on the region (described later) are stored on the tag 2 as the initial registration data.

The registration date/time is the date/time when the initial registration is performed. The region is the region where the initial registration is performed. As described later in detail, in the example embodiment, the data on the registration date/time and on the region is automatically written to the tag 2 by the information processing device 3 in the initial registration process.

Now, information included in the update data will be described. The update data is data that is updated when the tag 2 and the information processing device 3 communicate with each other (under a certain condition). In the example embodiment, the update data includes the following data.

Number of times of write (data representing the number of times of write)

Last-write device (data representing the last-write device)

Number of times of device change (data representing the number of times of device change)

Last-used application (data representing the last-used application)

Last-write date/time (data representing the last-write date/time)

As described later in detail, in the example embodiment, the update data stored on the tag 2 is updated (overwritten) at the timing when the dedicated data is written.

The number of times of write is the number of times the dedicated data has been written on the tag 2.

The last-write device is the information processing device that wrote the dedicated data to the tag 2 most recently. In the example embodiment, each of a plurality of information processing devices is assigned identification information specific thereto. Data on a hash value on the identification information on the information processing device that wrote data is stored as the data on the last-write device (alternatively, data on the identification information itself that wrote data may be stored).

The number of times of device change is the number of times the information processing device that wrote the dedicated data was changed. As described later in detail, in the case where, for example, an information processing device possessed by the user writes data to the tag 2 and then an information processing device different from the information processing device possessed by the user (e.g., an information processing device installed in a store the user visits or an information processing device possessed by a friend of the user) writes data to the tag 2, the number of times of device change is updated.

The last-used application is the application program that wrote the dedicated data to the tag 2 most recently. In the example embodiment, the data stored as the data on the last-used application is the identification information specific to the application program (may be the use ID).

The last-write date/time is the date/time when the dedicated data was written to the tag 2 most recently.

Now, the management data will be described. The management data is data used for management of the tag, and is used in, for example, an access permission/non-permission determination process or the like. Basically, the management data is not used in an application.

As shown in FIG. 3, the tag 2 stores data on version information in the read-only area 21 as the management data. The version information represents a version of a data format (storage format) of the tag 2. In the example embodiment, the data storage format of the data on the tag 2 varies on a version-by-version basis and that the same version has the same data storage format. Specifically, in the example embodiment, which data is stored at which address of the tag 2 is defined on a version-by-version basis (it should be noted that the address at which the data on the version information is stored is the same among different versions). Therefore, the information processing device 3 can specify the address at which each piece of data is stored by referring to the version information. For example, a data size of each piece of data (size of a storage area of each piece of data) may be defined by the version information, so that an address can be specified based on the version information.

The tag 2 stores a first hash value and a second hash value as the management data (see FIG. 3). The first hash value corresponds to the data in the read-only area 21. The second hash value corresponds to the data in the read/write area 22. The hash values are obtained by applying a predetermined algorithm (hash function) to the corresponding data. The contents of the data in the read-only area 21 are not changed, and the first hash value is not changed. Therefore, in the example embodiment, the data on the first hash value is stored in the read-only area 21. When the contents of the data in the read/write area 22 are changed, the second hash value is changed. Therefore, the data on the second hash value is stored in the read/write area 22.

In the example embodiment, the dedicated data and the shared data, among the data shown in FIG. 3, are encrypted by a method which allows the encrypted data to be decrypted by the information processing device 3 (in the example embodiment, the communication control unit 32 described later). The dedicated data and the shared data may be encrypted by the same method or different methods. Because of the encryption, even if the data is read from the tag 2 by a device that does not have a decryption function of the above-described method, such a device cannot decipher the contents of the data. This can improve the security of the data stored on the tag 2. In another embodiment, the management data may also be encrypted, or at least one of the three types of data does not need to be encrypted.

2. Processing Operations of the Information Processing System

Figure 4:
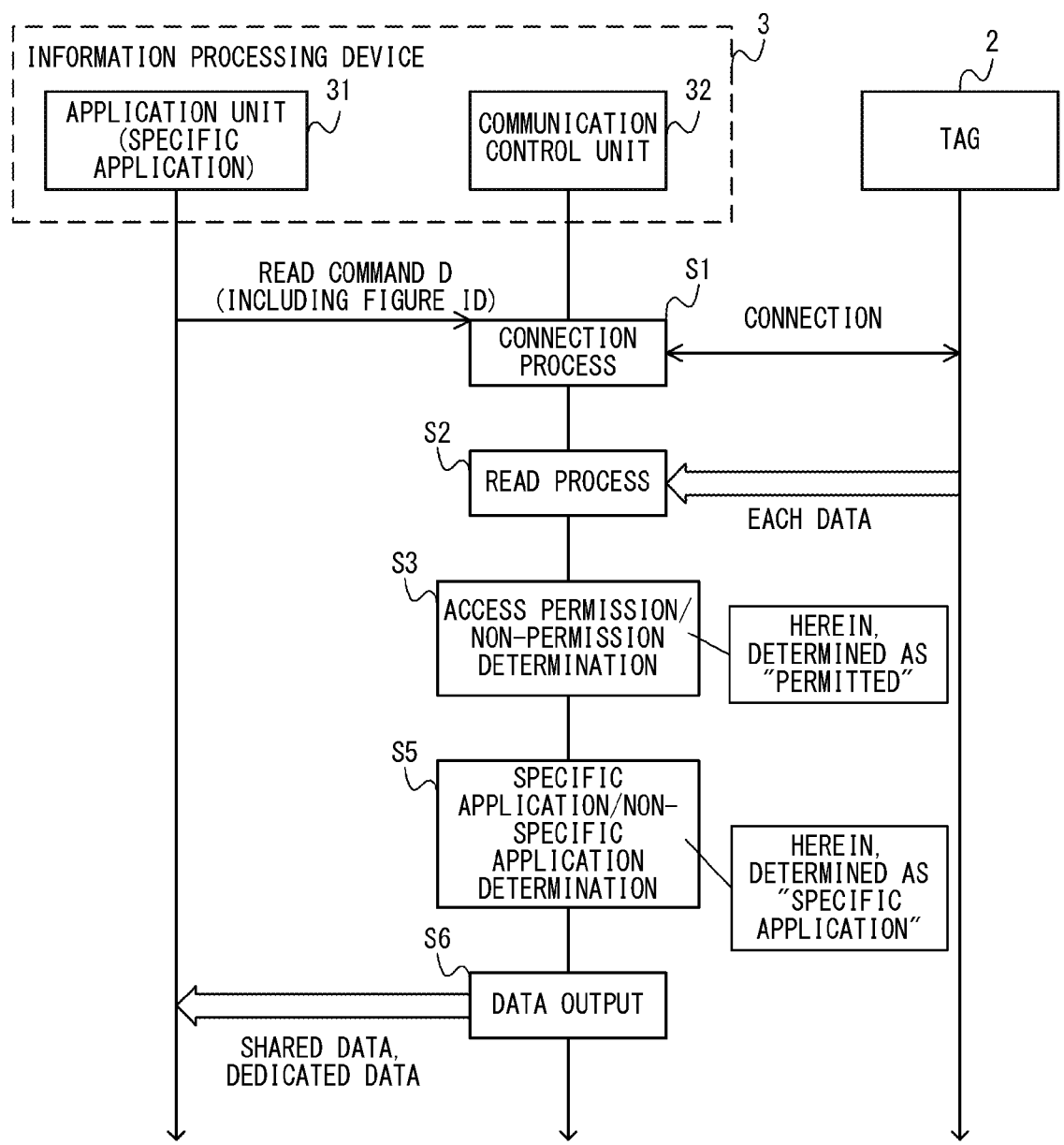
FIG. 4 shows an example of flow of a process, executed by the information processing system, of reading data from the tag by a specific application program.

Now, with reference to FIG. 4 through FIG. 12, processing operations of the information processing system 1 regarding data read and write from and to the tag 2 will be described. As shown in FIG. 4 and the like, in the example embodiment, the operations of the information processing device 3 will be described as being divided by function into the operations of an application unit 31 and operations of the communication control unit 32. In the example embodiment, the application unit 31 is the CPU 13 for executing a communication program as described above. The communication control unit 32 is realized by the CPU 13 for executing an application program as described above, the communication chip 12 and the communication unit 11. In another embodiment, the information process performed by the information processing device 3 does not need to be realized by two types of programs, namely, the application program and the communication program, and may be realized by a single program.

(2-1: Operation of Reading Data)

Figure 5:
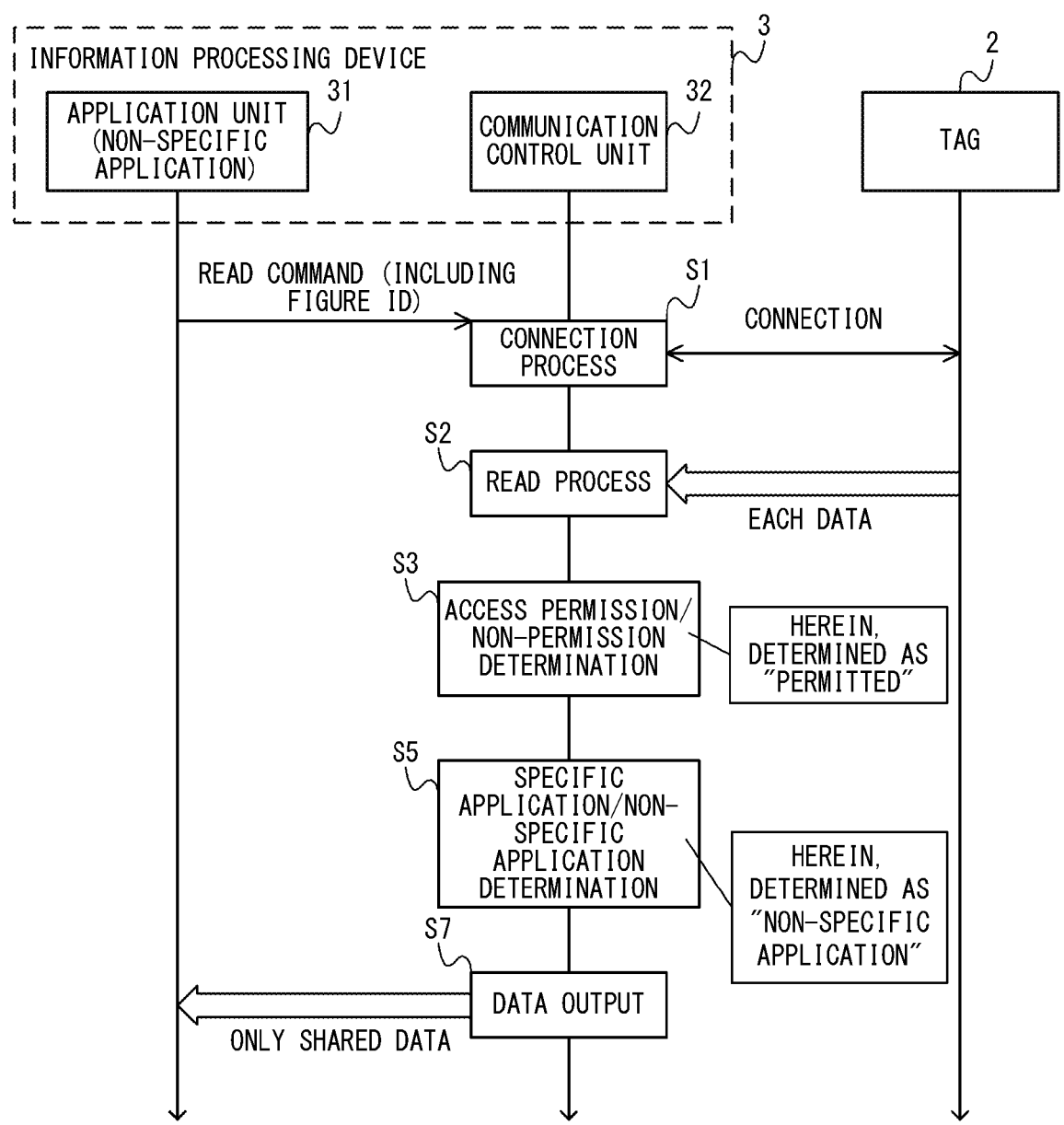
FIG. 5 shows an example of flow of a process executed by the information processing system for reading data from the tag by the specific application program.

Hereinafter, with reference to FIG. 4 through FIG. 6, an operation of reading data from the tag 2 will be described. FIG. 4 and FIG. 5 each show an example of flow of a process executed by the information processing system 1 for reading data from the tag 2 by a specific application program. FIG. 4 shows a flow in the case where a specific application program is executed by the information processing device 3, namely, in the case where the application unit 31 is realized by the CPU 13 that executes the specific application program. FIG. 5 shows a flow in the case where another application program that is not the specific application program is executed by the information processing device 3, namely, in the case where the application unit 31 is realized by the CPU 13 that executes the another application program.

Figure 6:
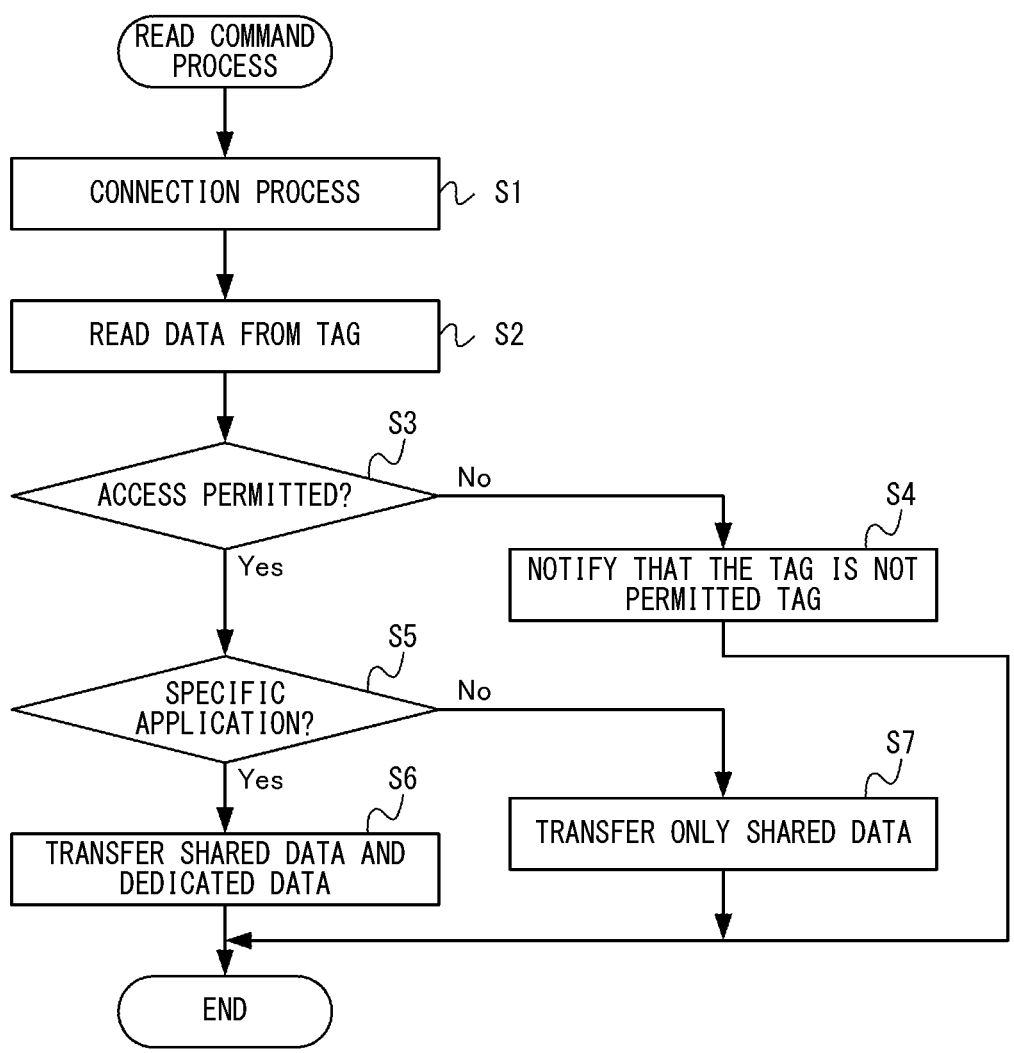
FIG. 6 is a flowchart showing an example of flow executed by a communication control unit when a read instruction is received (read instruction process)

FIG. 6 is a flowchart showing an example of flow of a process executed by the communication control unit 32 that has accepted a read instruction (i.e., showing a read instruction process). The process in each of steps in the flowchart shown in FIG. 6 (also the flowcharts in FIG. 8, FIG. 10 and FIG. 12 described later) is merely exemplary. As long as substantially the same results are obtained, the order of the processes of the steps may be changed, or another process may be executed in addition to (or instead of) the process of each step. In the example embodiment, the process of each step in the flowcharts will be described as being executed by the CPU 13. Alternatively, the process of a part of the steps in the flowcharts may be executed by a processer other than the CPU 13 or by a dedicated circuit.

First, the application unit 31 transmits a read instruction, which is to read data from the tag 2, to the communication control unit 32 (see FIG. 4 and FIG. 5). In the example embodiment, the read instruction includes the figure ID. As described above, the specific application program includes information on the figure ID of the tag storing the dedicated data usable in the specific application program itself. Therefore, the application unit 31 transmits the figure ID included in the specific application program together with the read instruction to the communication control unit 32.

The application program 31 transmits all the figure IDs included in the specific application program. In the case where the type of the tag can be specified, the application program 31 may transmit, to the communication control unit 32, only the figure ID of the tag among one or more figure IDs included in the specific application program. For example, in the case where in a game situation of using a tag representing a character operated by a player, data on the tag is to be read, the tag 2 connected to the information processing device 3 can be specified as the tag representing the character. Therefore, in this case, the application unit 31 may transmit only the figure ID of the tag 2 representing the character to the communication control unit 32.

In another embodiment, the application unit 31 may transmit the figure ID to the communication control unit 32 at a different timing from the timing when the read instruction is transmitted (this is applicable to other instructions including a write instruction). For example, in another embodiment, the communication control unit 32 may request the application unit 31 to transmit the figure ID in a specific application/non-specific application determination process described later, and the application unit 31 may transmit the figure ID to the communication control unit 32 in response to the request.

Upon acceptance of the read instruction, the communication control unit 32 starts execution of a series of processes of steps S1 through S7 shown in FIG. 4 through FIG. 6 (read instruction process). First, in step S1, the communication control unit 32 executes a connection process in order to start communication with the tag 2. The specific content of the connection process is optional. For example, the communication control unit 32 executes a process of detecting the tag 2 present in the vicinity of the communication unit 11 (e.g., polling process) and a process of establishing communication with the detected tag 2 (e.g., process of acquiring information to be used for data communication from the tag 2). Although not shown, in the case where the tag 2 is distanced from the information processing device 3 and it is made impossible to perform near field communication during the read instruction process (also in a registration instruction process or the write instruction process described later), the communication control unit 32 terminates the read instruction process and discontinues data transfer with the application unit 31.

In step S2, the communication control unit 32 executes a data read process. Specifically, the communication control unit 32 first reads the management data from the tag 2. Based on the version information included in the read management data, the communication control unit 32 specifies the address of each piece of data (data included in the dedicated data and the shared data) in the tag 2. The method for specifying the address based on the version information may be optional. For example, the version information itself may include information that represents the correspondence between each piece of data and the address. Alternatively, the communication control unit 32 may store a table associating the correspondence and the version information in advance, so that the communication control unit 32 can specify the correspondence by use of the version information read from the tag 2 and the table.

Once the address of each piece of data included in the dedicated data and the shared data is specified, the communication control unit 32 reads the shared data and the dedicated data from the tag 2. The communication control unit 32 decrypts and stores the read data on the memory 14. In this manner, in the example embodiment, the communication control unit 32 reads the shared data and the dedicated data from the tag 2 regardless of the content of the read instruction from the application unit 31 (which of the data stored on the tag 2 is to be read) and the type of the application program (whether or not the application program is the specific application program).

In step S3, the communication control unit 32 executes the access permission/non-permission determination process. The access permission/non-permission determination process is a process of determining whether or not an access by the application program to be executed by the information processing device 3 to the tag with which the communication has been established is permissible. In other words, the access permission/non-permission determination process is a process of determining whether or not the tag with which the communication has been established is a permitted tag. The "permitted tag" refers to a tag, an access to which by the application program to be executed by the information processing device 3 is permitted. The permitted tag is, for example, a tag permitted by a provider of the information processing device 3 (and/or of the application program executable by the information processing device 3). Namely, in the example embodiment, the application program on the information processing device 3 can access only the tag permitted by the provider, and cannot read/write data from/to an NFC tag that is not permitted by the provider.

In the example embodiment, the determination in the access permission/non-permission determination process is made by use of the hash values on the data stored on the tag 2 (first hash value and second hash value). Specifically, the communication control unit 32 calculates a hash value (first hash value) on the data that has been read in step S2 from the read-only area 21 by use of the predetermined algorithm. The communication control unit 32 determines whether or not the calculated hash value matches the first hash value read in step S2. In the case where these two hash values match each other, the communication control unit 32 makes a similar determination on the data that has been read from the read/write area 22 and the second hash value. Namely, the communication control unit 32 calculates a hash value (second hash value) on the data that has been read in step S2 from the read/write area 22 by use of the predetermined algorithm, and determines whether or not the calculated hash value matches the second hash value read in step S2.

In the case where the calculated hash value matches the read second hash value, the communication control unit 32 determines that the tag 2 is a permitted tag. In this case, the communication control unit 32 executes a process of step S5. By contrast, in the case where the hash values do not match each other in one of the determinations, the communication control unit 32 determines that the tag 2 is not a permitted tag. In this case, the communication control unit 32 executes a process of step S4.

As described above, in the example embodiment, the tag 2 stores the hash values (first hash value and second hash value) on a part of, or the entirety of, the data stored thereon. The communication control unit 32 determines whether or not the tag 2 is a permitted tag based on the hash value calculated based on the data read from the tag 2 and the hash value read from the tag 2. The hash values are stored on the tag 2 as described above, so that the determination on whether or not the tag 2 is a permitted tag can be made easily.

In another embodiment, the determination in the access permission/non-permission determination process may be made by another method. For example, the communication control unit 32 may store, in advance, predetermined information stored on the tag 2 (also on the side of the information processing device 3) and make the determination based on whether or not the information read from the tag matches the information stored in advance. The predetermined information usable for the determination may be, for example, the following information.

Information that is stored on an NFC tag and represents the type of the tag defined by the NFC standards (Type 1, Type 2, etc.)

Information (exclusive code) that represents that the tag 2 is a tag permitted by the provider of the information processing device 3 (and/or of the application program executable by the information processing device 3)

Version information as described above

Alternatively, for example, the determination in the access permission/non-permission determination process may be made based on whether or not the data stored in the read-only area 21 is adapted to the setting specified by the version information. Still alternatively, for example, the determination in the access permission/non-permission determination process may be made based on whether or not the size of the predetermined data read by the communication control unit 32 (e.g., data stored in the read-only area 21) is within a predetermined range.

In step S4, the communication control unit 32 notifies the application unit 31 that the tag 2 is not a permitted tag. Upon receipt of this notification, the application unit 31 may perform an optional process. For example, the application unit 31 notifies the user that the tag 2 is not a permitted tag and therefore data cannot be read. After the process of step S4, the communication control unit 32 terminates the read instruction process shown in FIG. 6.

In step S5, the communication control unit 32 executes a specific application/non-specific application determination process. The specific application/non-specific application determination process is a process of determining whether or not the application program that issued the instruction to the communication control unit 32 (herein, the read instruction) is a specific application program.

The determination in the specific application/non-specific application determination process is made by use of the figure ID. Namely, the communication control unit 32 compares the figure ID acquired from the application unit 31 together with the instruction (in the case where there a plurality of figure IDs, one of the figure IDs) against the figure ID read from the tag 2 in step S2. In the case where the figure IDs match each other, the communication control unit 32 determines that the application program that issued the instruction is a specific application program. In this case, the communication control unit 32 executes a process of step S6. By contrast, in the case where the figure IDs do not match each other, the communication control unit 32 determines that the application program that issued the instruction is a non-specific application program (application program that is not a specific application program). In this case, the communication control unit 32 executes a process of step S7.

In step S6, the communication control unit 32 transfers (outputs) the dedicated data and the shared data to the application unit 31 (see FIG. 4). Namely, in the case where the application program that issued the instruction is a specific application program, the communication control unit 32 permits the application unit 31 to receive the dedicated data. After the process of step S6 is finished, the communication control unit 32 terminates the read instruction process shown in FIG. 6.

Upon receipt of the dedicated data and the shared data from the communication control unit 32, the application unit 31 executes an information process by use of the received data. The content of the information process is optional. For example, the application unit 31 executes a game process by use of the saved data, which is the dedicated data. In the example embodiment, the specific application program uses the saved data, which is the dedicated data. Alternatively, the specific application program may use the shared data in addition to (or instead of) the dedicated data.

In step S7, the communication control unit 32 transfers (outputs) the shared data to the application unit 31 (see FIG. 5). Namely, in the case where the application program that issued the instruction is a non-specific application program, the communication control unit 32 restricts (prohibits) the application unit 31 from receiving the dedicated data. After the process of step S7 is finished, the communication control unit 32 terminates the read instruction process shown in FIG. 6.

Upon receipt of the shared data from the communication control unit 32, the application unit 31 executes an information process by use of the received data. The content of the information process is optional. For example, the application unit 31 may execute the following processes.

Figure 12:
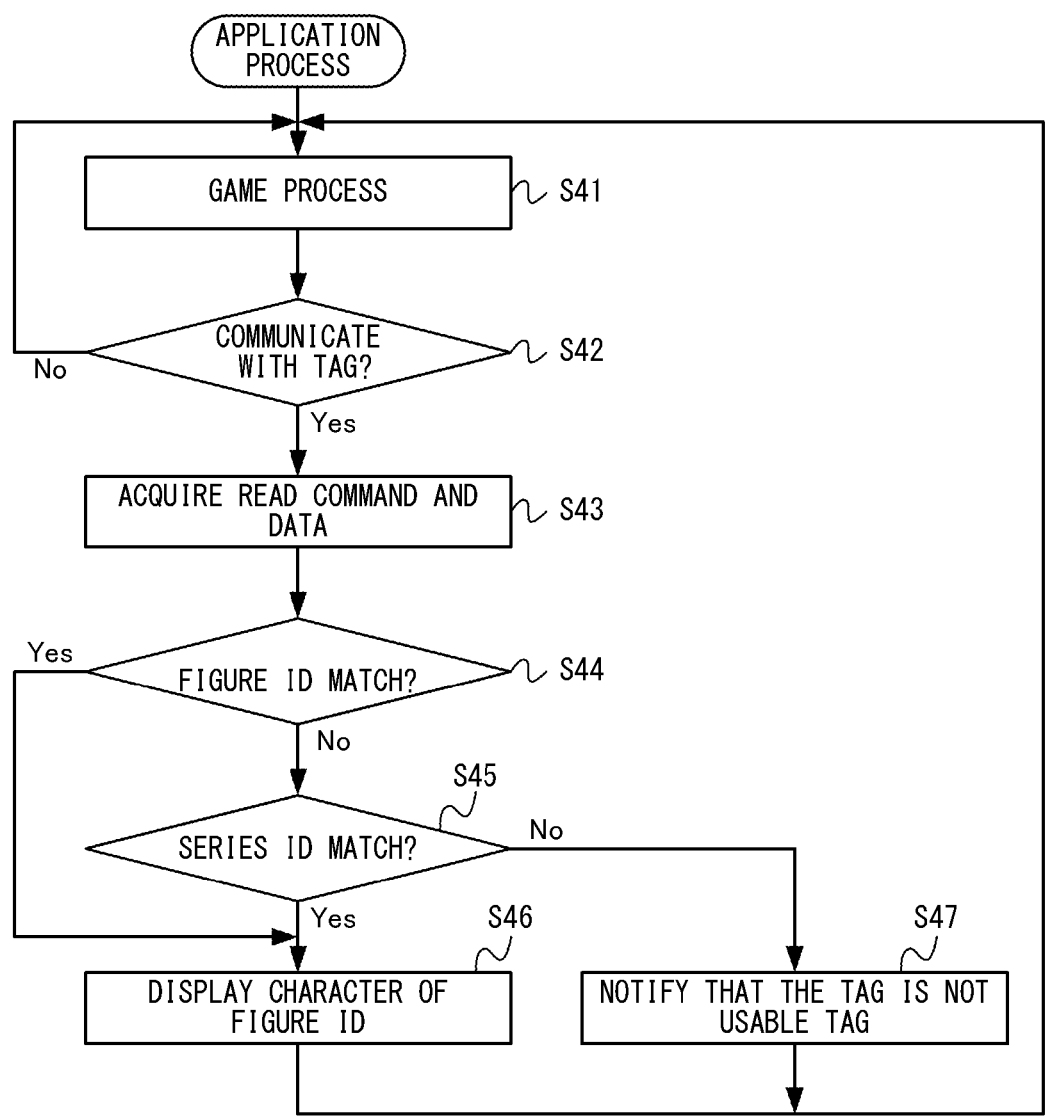
FIG. 12 is a flowchart showing an example of flow of a process executed by a CPU by an application program.

Process of using the figure ID to display a character represented by the figure ID (see FIG. 12)

Process of using the avatar data to display an avatar of the user (e.g., process of executing a game using the avatar as a player character)

Process of storing the nickname on the information processing device 3 and displaying the nickname at an appropriate timing Process in accordance with the content of the update data (e.g., process of providing a benefit for the game in the case where the number of times of write is equal to or greater than a predetermined number of times; process of displaying the message "long time no see" in the case where the last-write date/time is before a predetermined time; etc.)

In the example embodiment, in the data output process of step S6 or S7, the communication control unit 32 outputs all of the shared data (and the dedicated data) stored on the tag 2 to the application unit 31. In another embodiment, the application unit 31 may specify, in the read instruction, the data to be acquired, and output the data specified in the read instruction to the application unit 31 in the process of S6 or S7. In the case where the data specified in the read instruction is the dedicated data and it is determined in step S4 that the application program that issued the read instruction is a non-specific application program, the communication control unit 32 may notify the application unit 31 in step S7 that the data output (read) is restricted.

(2-2: Operation for Initial Registration)

Figure 7:
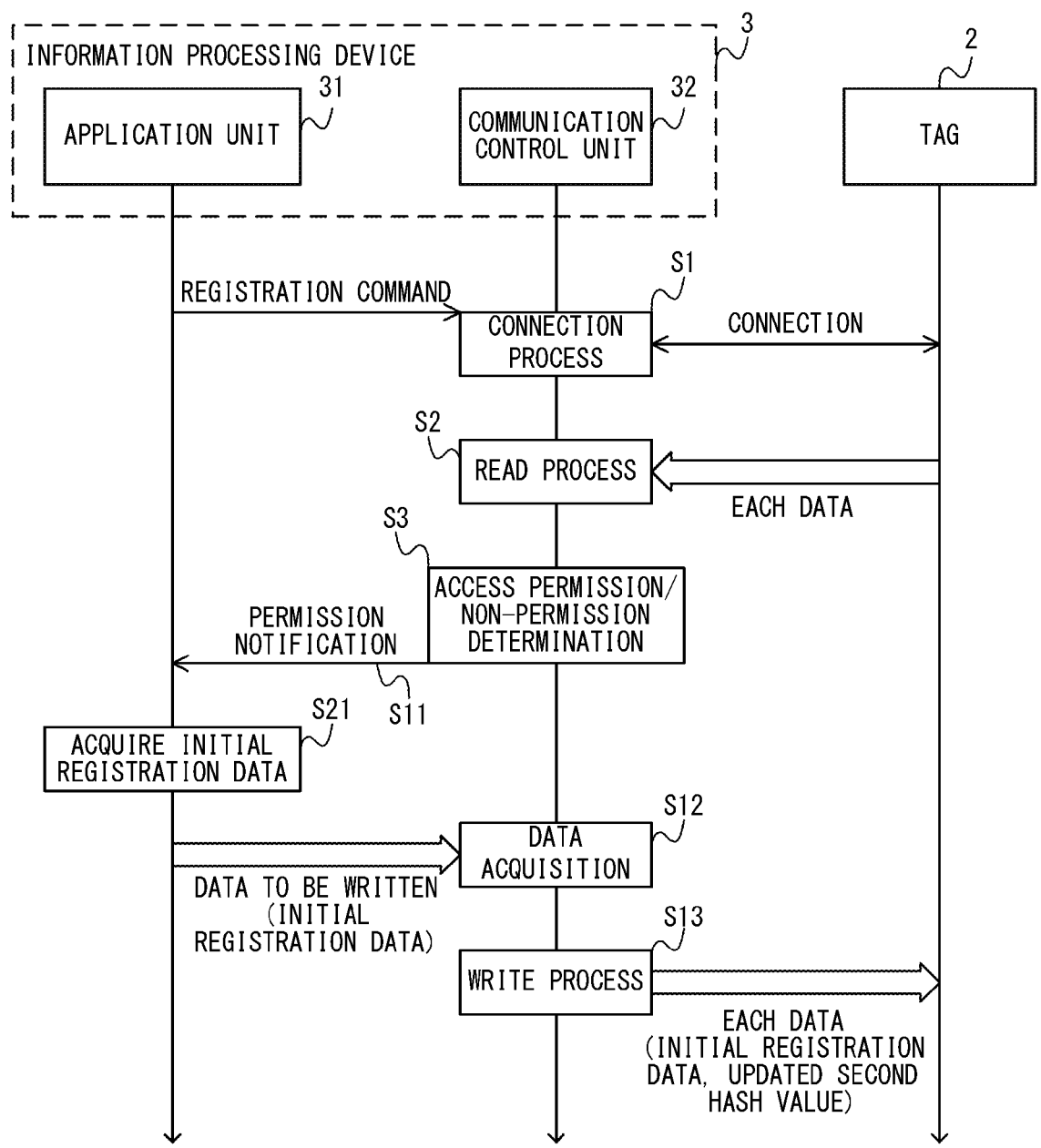
FIG. 7 shows an example of flow of a process executed by the information processing system for writing initial registration data to the tag.
Figure 8:
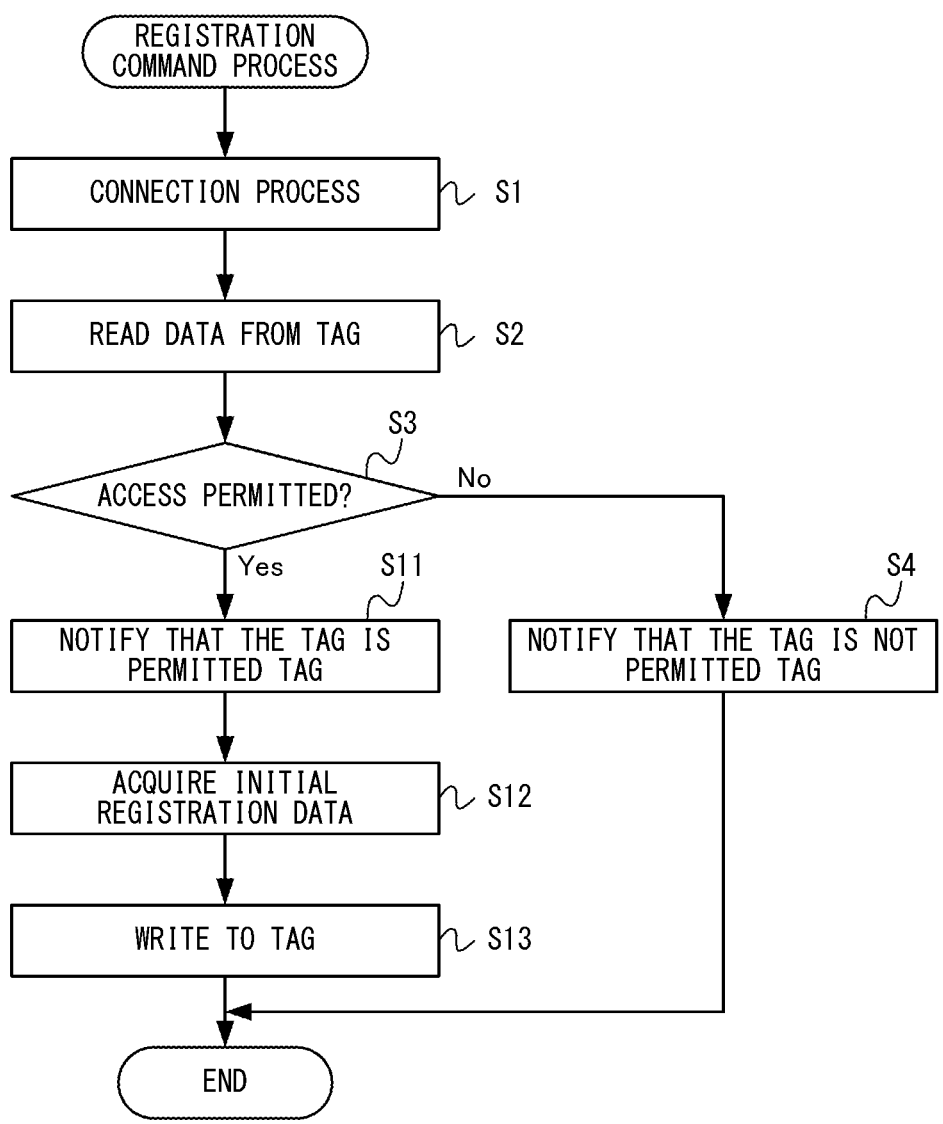
FIG. 8 is a flowchart showing an example of flow executed by the communication control unit when a registration instruction is received (registration instruction process)

Now, with reference to FIG. 7 and FIG. 8, an operation of writing the initial registration data to the tag 2 will be described. FIG. 7 shows an example of flow of a process executed by the information processing system 1 for writing the initial registration data to the tag 2. FIG. 8 is a flowchart showing an example of flow of a process executed by the communication control unit 32 that has accepted a registration instruction (i.e., showing a registration instruction process).

First, the application unit 31 outputs a registration instruction to the communication control unit 32, and the communication control unit 32 accepts the registration instruction. The registration instruction is an instruction to write the initial registration data to the tag 2. In the example embodiment, the application unit 31 issuing the registration instruction is realized by a system application program (OS program) in the information processing device 3. Namely, the initial registration data is written by the system application program (as a function of the information processing device 3). For example, an instruction to make an initial registration to the tag 2 is issued by the user while the system application program is executed (e.g., while a menu screen is displayed). In response to this instruction being accepted, the application unit 31 outputs the registration instruction.

In the example embodiment, only the system application can write the shared data. In another embodiment, another application (specific application and/or non-specific application) can write the shared data.

Upon acceptance of the registration instruction, the communication control unit 32 starts execution of a series of processes of steps S1 through S3 and steps S11 through S13 shown in FIG. 7 and FIG. 8 (registration instruction process). The processes of steps S1 through S3 shown in FIG. 8 are the same as those shown in FIG. 6.

In the registration instruction process, in the case where the determination result in step S3 is positive (in the case where the tag 2 is a permitted tag), a process of step S11 is executed. By contrast, in the case where the determination result in step S3 is negative (in the case where the tag 2 is not a permitted tag), a process of step S4 shown in FIG. 6 is executed.

In the registration instruction process, upon receipt of the notification that the tag 2 is not a permitted tag as a result of the process of FIG. 4, the application unit 31, for example, notifies the user that the tag 2 is not a permitted tag and therefore data cannot be registered. After the process of step S4, the communication control unit 32 terminates the registration instruction process shown in FIG. 8

By contrast, in step S11, the communication control unit 32 outputs a notification that the tag 2 is a permitted tag (permission notification) to the application unit 31. FIG. 7 shows a process executed in the case where the permission notification is output to the application unit 31.

Upon receipt of the permission notification, the application unit 31 acquires the initial registration data to be written to the tag 2 (step S21 shown in FIG. 7). In the example embodiment, the application unit 31 accepts the avatar data and data on the nickname from the user, and also acquires the data on the registration date/time and on the region. Specifically, the application unit 31 prepares in advance a plurality of candidates of each part of the avatar (eyes, nose, etc.) and causes the user to choose a desirable shape from the candidates. In this manner, the avatar data conformed to the instruction of the user can be acquired. The application unit 31 causes the user to input desired letter information, so that the nickname can be acquired. Data representing the current date/time and data representing the region (country) where the information processing device 3 exists are stored on the information processing device 3, so that the application unit 31 acquires these types of data. The application unit 31 transfers (outputs) the initial registration data thus acquired to the communication control unit 32.

In step S12, the communication control unit 32 acquires the initial registration data from the application data 31. In another embodiment, the communication control unit 32 may acquire data specified by the user (avatar data and data on the nickname) from the application unit 31 and acquire the data stored on the information processing device 3 (data on the current date/time and on the region) by the communication control unit 32 itself.

In step S13, the communication control unit 32 executes a write process to the tag 2. In the example embodiment, the entirety of the data to be stored in the read/write area 22 is written to the tag 2 as one unit. Namely, the communication control unit 32 writes the dedicated data read in step S2, new shared data which includes the shared data read in step S2 and the initial registration data, and the data on the second hash value to the tag 2. As the shared data excluding the initial registration data, the data read and stored on the memory 14 in step S2 is used. The addition of the initial registration data changes the contents of the shared data. Therefore, in step S13, the communication control unit 32 calculates a hash value on the post-change shared data (shared data including the initial registration data), and writes the calculated hash value to the tag 2 as a new second hash value. After the process of step S13, the communication control unit 32 terminates the registration instruction process.

The above description is provided with an assumption that the initial registration data is not stored on the tag 2. In the case where the initial registration data is stored on the tag 2 also, substantially the same registration instruction process as described above can be executed to update the contents of the initial registration data. In this case, in step S13, the communication control unit 32 writes the dedicated data read in step S2, and new shared data obtained as a result of the initial registration data included in the shared data read in step 2 being updated, to the tag 2. As described above, the application unit 31 may transmit the registration instruction to the application unit 31 in order to update the initial registration data already registered on the tag 2 as well as in order to newly write the initial registration data to the tag 2.

In another embodiment, the communication control unit 32 may execute the process of writing the initial registration data at the time of performing the near field communication with the tag in response to the read instruction or the write instruction. In the case where, for example, data is read from the tag 2 in step S2 in the read instruction process, the communication control unit 32 may determine whether or not the initial registration data is stored on the tag 2, and in the case where the initial registration data is not stored on the tag 2, the communication control unit 32 may make a notification to the application unit 31. In response to this notification, the application unit 31 may execute the process of step S21 and the communication control unit 32 may execute the processes of steps S12 and S13. In this manner, the communication control unit 32 can write the initial registration data to the tag 2 in the read instruction process (in the case where the initial registration data has not been registered).

(2-3: Operation of Writing Data)

Figure 9:
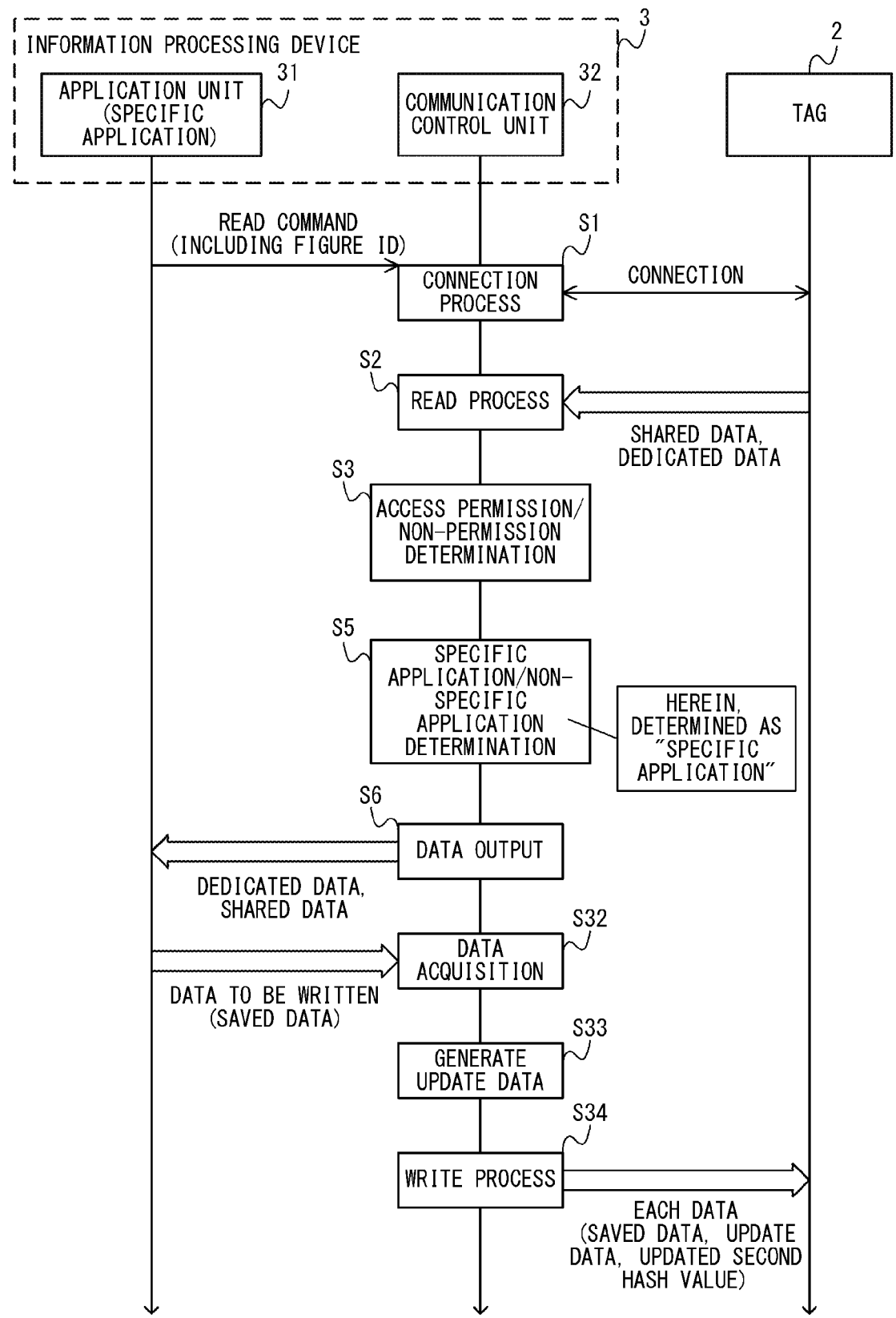
FIG. 9 shows an example of flow of a process executed by the information processing system for writing dedicated data to the tag.
Figure 10:
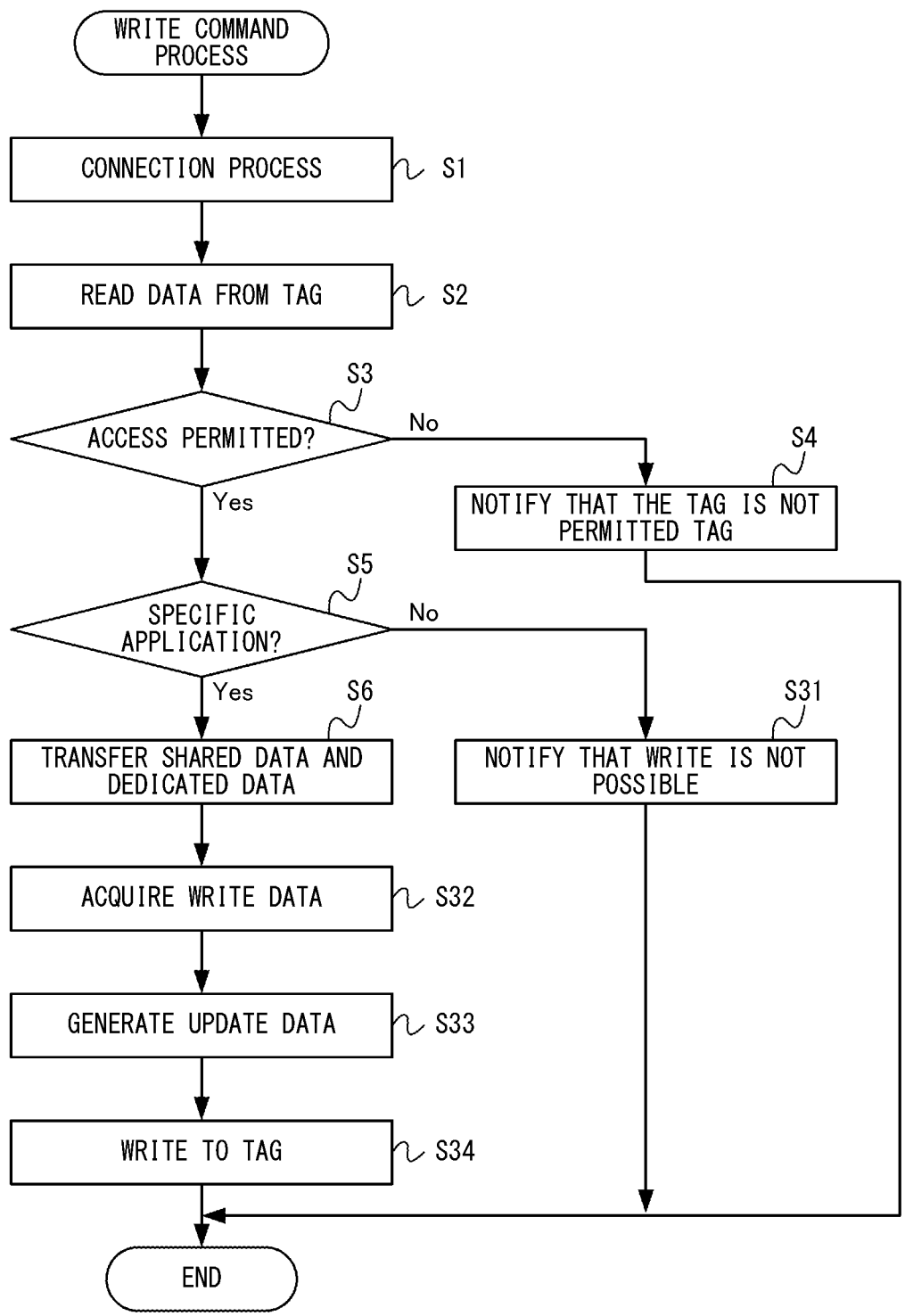
FIG. 10 is a flowchart showing an example of flow executed by the communication control unit when a write instruction is received (write instruction process)

Now, with reference to FIG. 9 and FIG. 10, an operation of writing the dedicated data (and the update data) to the tag 2 will be described. FIG. 9 shows an example of flow of a process executed by the information processing system 1 for writing the dedicated data to the tag 2. FIG. 10 is a flowchart showing an example of flow of a process executed by the communication control unit 32 that has received a write instruction (i.e., showing a write instruction process).

First, the application unit 31 transmits a write instruction, which is to write data to the tag 2, to the communication control unit 32 (see FIG. 9 and FIG. 10). The write instruction includes the figure ID included in the application program in the application unit 31, like the read instruction described above.

Upon acceptance of the write instruction, the communication control unit 32 starts execution of a series of processes shown in FIG. 10 (write instruction process). The processes of steps S1 through S6 in the write instruction process are substantially the same as those in the read instruction process described above. As can be seen, in the example embodiment, data is read from the tag 2 before data is written to the tag 2. As described later in detail, the read data is appropriately changed, and the post-change data is written to the tag 2.

In the write instruction process, in the case where the determination result in step S5 is negative (in the case where the application program that issued the write instruction is not a specific application program), a process of step S31 is executed. In step S31, the communication control unit 32 notifies the application unit 31 that the data cannot be written. Upon receipt of this notification, the application unit 31 executes an optional process. For example, the application unit 31 executes a process of notifying the user that the connected tag 2 is a not tag to which the application program that is being executed can write data. After the process of step S31, the communication control unit 32 terminates the write instruction process.

By contrast, in the case where the determination result in step S5 is positive (in the case where the application program that issued the write instruction is a specific application program), a process of step S6 is executed. Namely, the communication control unit 32 transfers (outputs) the dedicated data and the shared data to the application unit 31 (see FIG. 9 and FIG. 10). As described above, the data to be transferred to the application unit 31 in step S6 is not limited to the dedicated data and the shared data. For example, only the dedicated data (saved data) may be transferred. In the write instruction process, the communication control unit 32 may execute a process of notifying the application unit 31 that the data write is permitted instead of the process of step S6.

Upon receipt of the dedicated data and the shared data, the application unit 31 transfers the data to be written to the tag 2 (herein, saved data) to the communication control unit 32. Namely, in step S32, the communication control unit 32 acquires the data to be written to the tag 2 from the application unit 31.

In step S33, the communication control unit 32 generates update data to be written to the tag 2. As described above, in the example embodiment, the update data is updated at the time when the dedicated data (saved data) is written to the tag 2. Therefore, the communication control unit 32 acquires (generates) data on the number of times of write, the last-write device, the number of times of device change, the last-used application, and the last-write date/time. Specifically, as the data on the number of times of write, the communication control unit 32 generates data representing a value that is obtained as a result of 1 being added to the number of times of write represented by the update data read in step S2. As the data on the last-write device, the communication control unit 32 acquires data on the identification information on the information processing device 3, which is stored on the information processing device 3 itself (e.g., on the memory 14). As the data on the last-used application, the communication control unit 32 acquires the data on the identification information on the application program that issued the write instruction (application ID) from this application program. As the data on the last-write date/time, the communication control unit 32 acquires the current date/time. The data on the number of times of device change is calculated as follows.

Figure 11:
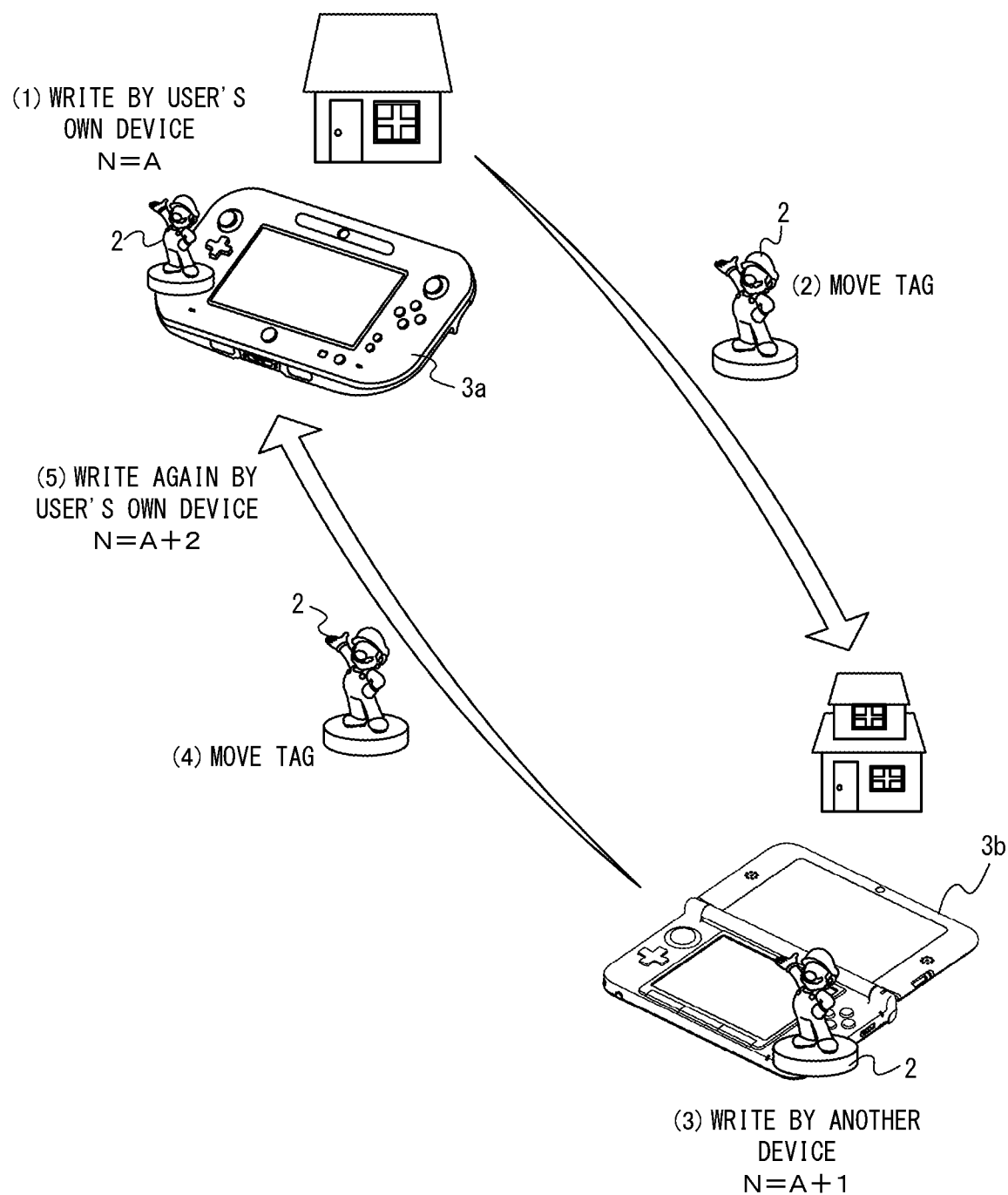
FIG. 11 shows an example of method for counting the number of times of device change.

FIG. 11 shows an example of method for counting the number of times of device change. FIG. 11 shows a case where the user first writes data (saved data) to the tag 2 by use of an information processing device 3a possessed by the user at home. It is assumed that the number of times of device change N at this point is "A". Even if the user writes saved data to the tag 2 by use of the information processing device 3*a* after this, the number of times of device change N remains "A".

As shown in FIG. 11, after the saved data is written to the tag 2 by the information processing device 3*a*, the user (moves with the tag 2 and) writes saved data to the tag 2 by use of another information processing device 3*b*. The another information processing device 3*b* is, for example, an information processing device possessed by a friend of the user, or an information processing device installed in a store for the purpose of sales promotion or the like. At the time when the saved data is written to the tag 2 by the another information processing device 3*b*, the number of times of device change N is updated to "A+1". Even if saved data is written to the tag 2 by the another information processing device 3*b* after this, the number of times of device change N remains "A+1".

As shown in FIG. 11, after this, the user (moves with the tag 2) and writes saved data to the tag 2 by use of the information processing device 3*a* possessed by the user. At the time when the saved data is written to the tag 2 by the information processing device 3*a*, the number of times of device change N is updated to "A+2".

As described above, in the example embodiment, in the case where the information processing device used to write data (saved data) the immediately previously time is different from the information processing device used to write data (saved data) currently, the number of times of device change is incremented by 1. By contrast, in the case where such information processing devices are the same, the value of the number of times of device change is kept the same.

Therefore, in the process of step S33, the communication control unit 32 determines whether or not the information on the last-write device included in the shared data (update data) read in step S2 represents the information processing device 3 that issued the current write instruction. Namely, the communication control unit 32 determines whether or not the information on the last-write device included in the update data read in step S2 matches the information on the last-write device acquired in step S33 in the current cycle of operation. In the case where the information processing devices match each other, the communication control unit 32 determines that the information processing device that wrote data was not changed, and keeps the value of the number of times of device change. Namely, the communication control unit 32 sets the value of the number of times of device change read in step S2 as the value of the number of times of device change to be written to the tag 2. By contrast, in the case where the information processing devices do not match each other, the communication control unit 32 determines that the information processing device that wrote data was changed, and increments the value of the number of times of device change. Namely, the communication control unit 32 sets a value that is obtained as a result of 1 being added to the number of times of device change read in step S2 as the value of the number of times of device change to be written to the tag 2.

In the example embodiment, the update data to be updated is acquired or generated as described above.

In step S34, the communication control unit 32 executes the write process to the tag 2. As described above, in the example embodiment, the entirety of the data to be stored in the read/write area 22 is written to the tag 2 as one unit. Namely, the communication control unit 32 writes the new dedicated data acquired from the application unit 31 in step S32, and the shared data including the new update data acquired in step S33 to the tag 2. As the shared data excluding the update data, the data read and stored on the memory 14 in step S2 is used. The change of the update data changes the contents of the shared data. Therefore, in step S34, the communication control unit 32 calculates a hash value on the post-change shared data (shared data including the changed update data), and writes the calculated hash value to the tag 2 as a new second hash value. After the process of step S34, the communication control unit 32 terminates the write instruction process.

As described above, in the example embodiment, the update data is updated in the wake of the dedicated data being written to the tag 2. Alternatively, the update data may be updated at an optional timing. For example, information on the read from the tag 2 may be included in the update date (see, "4. Modification examples" described later). In this case, the update data may be updated at the timing when the data is read from the tag 2. Namely, the communication control unit 32 may execute a process of generating new update data and writing the new update data to the tag 2 after the process of step S6 or S7 in the read instruction process.

In the example embodiment, the communication control unit 32 writes the update data to the tag 2 regardless of whether or not the initial registration data is stored on the tag 2. In the example embodiment, the information processing device 3 (communication control unit 32) may write the update data to the tag 2 under the condition that the initial registration data is stored on the tag 2. In this case, the update data (e.g., number of times of write, etc.) from the time point when the initial registration is performed can be recorded.

As described above, in the example embodiment, the entirety of main data (dedicated data and shared data) as one unit is read from, or written to, the tag 2. Namely, when being read from the tag 2, the entirety of the main data is read (even when only a part of the main data needs to be read). When data is to be written to the tag 2 (when the main data on the tag 2 is to be rewritten), the entirety of the main data is rewritten (even when only a part of the main data needs to be rewritten).

In another embodiment, data write or data read to or from the tag 2 may be executed in predetermined units. For example, in the case where the storage area of the tag 2 is divided into a plurality of blocks, the data write or data read to or from the tag 2 may be executed on a block-by-block basis.

(2-4: Process Example 1 by the Application Program)

Now, with reference to FIG. 12, an example of process executed by the CPU 13 (application unit 31) of the information processing device 3 in accordance with an application program will be described. FIG. 12 is a flowchart showing an example of flow of a process executed by the CPU 13 in accordance with an application program. The process shown in FIG. 12 is started in response to, for example, the user issuing an instruction to start the application.

FIG. 12 shows a game process as an example of process executed in accordance with an application program. In the example of process shown in FIG. 12, the character represented by the tag 2 is caused to appear in a game space by use of the shared data (figure ID and series ID) stored on the tag 2.

In step S41, the application unit 31 executes a game process in accordance with an application program. The contents of the game process are optional. The process that is executed is, for example, a process of controlling the operation of the character in a virtual space (game space) in response to an input of the user, or a process of controlling the operation of another character in accordance with an algorithm defined by the program.

In step S42, the application unit 31 determines whether or not to communicate with the tag 2. Namely, the application unit 31 determines whether or not a predetermined game condition for communicating with the tag 2 has been fulfilled. The predetermined game condition is that a game situation in which the character represented by the tag 2 can appear is obtained; more specifically, that a player character has advanced to a predetermined stage; that a player character has acquired a predetermined item; or the like. The process of step S42 is executed at an appropriate timing while the game process is executed in step S41. Therefore, in the case where the determination result in step S42 is negative, the process of step S41 is executed again, and the processes of steps S41 and S42 are repeated until the determination result in step S42 becomes positive. By contrast, in the case where determination result in step S42 is positive, a process of step S43 described later is executed.

In step S43, the application unit 31 outputs a read instruction and reads data from the tag 2. Namely, as described above, the application unit 31 first outputs a read instruction to the communication control unit 32 (see FIG. 4, etc.). In response to this read instruction, the communication control unit 32 communicates with the tag 2 (step S1), and transfers the data read from the tag 2 to the application unit 31 (steps S2, S6, S7). In this manner, the application unit 31 acquires the data from the tag 2. As described above, in the case where the application program that is being executed is a specific application program, the dedicated data and the shared data are acquired. In the case where the application program that is being executed is a non-specific application program, the shared data is acquired. When the data from the tag 2 is acquired in step S43, a process of step S44 is executed.

Although not shown in FIG. 12, in the case where the tag 2 that is connected to the information processing device 3 is not a permitted tag (in the case where the determination result in step S3 is negative), the communication control unit 32 notifies the application unit 31 that the tag 2 is not a permitted tag. In this case, the application unit 31, for example, notifies the user that the data cannot be read, and restarts the process of step S1.

In step S44, the application unit 31 determines whether or not the figure ID acquired in step S43 corresponds to the character registered in the application program that is being executed. The application program includes data for generating characters caused to appear in the game by the tag 2. In the application program, information on a figure ID associated with each of the characters is registered in advance. The determination in step S44 is executed based on whether or not the figure ID acquired in step S43 matches any one of the figure IDs registered in the application program that is being executed. By contrast, in the case where the determination result in step S44 is positive, a process of step S46 described later is executed. In the case where the determination result in step S44 is negative, a process of step S45 described later is executed.

In step S45, the application unit 31 determines whether or not the series ID acquired in step S43 matches the series ID to be set for the application program that is being executed. In the application program, information on the series ID to be set for the application program is registered in advance. Therefore, the application unit 31 determines whether or not the series ID acquired in step S43 matches the series ID registered in the application program that is being executed. In the case where it is determined in step S45 that the two series IDs match each other, it is found that the character represented by the figure ID stored on the tag 2 is a character registered in the series to which the application program belongs (although not registered in the application program). In the case where the determination result in step S45 is positive, the process of step S46 described later is executed. By contrast, in the case where the determination result in step S45 is negative, a process of step S47 described later is executed.

In step S46, the application unit 31 executes a process of causing the character represented by the figure ID to appear in the virtual space. In the case where the application unit 31 knows the character represented by the figure ID stored on the tag 2 (in the case where the figure ID is registered in the application program, namely, in the case where the determination result in step S44 is positive), the application unit 31 can cause the character to appear in the virtual space by use of the information in the application program thereof. Namely, the application unit 31 generates the character in the virtual space by use of the information in the application program thereof.

By contrast, in the case where the application unit 31 does not know the character represented by the figure ID stored on the tag 2 (in the case where the figure ID is not registered in the application program, namely, in the case where the determination result in step S44 is negative and the determination result in step S45 is positive), the application unit 31 cannot cause the character to appear in the virtual space by use of the information in the application program thereof. Therefore, the application unit 31 uses the figure ID acquired from the tag 2 to specify the character represented by the figure ID and causes the specified character to appear in the virtual space. For example, the application unit 31 accesses an external server, transmits the figure ID acquired from the tag 2 to the server, and receives data on the character transmitted from the server in response thereto (data for generating the character). In the case where the application program that is being executed is a specific application program, the data for generating the character may be included in the saved data so that the application unit 31 can generate the character by use of the saved data.

The process of step S46 of causing the character to appear in the virtual space may be different between the case where the application program that is being executed is a specific application program and the case where application program that is being executed is a non-specific application program. For example, in the case where the application program that is being executed is a specific application program, the application unit 31 may display the entirety of the character represented by the tag 2 (displays the character as it is) on the display unit 17. By contrast, in the case where the application program that is being executed is a non-specific application program, the application unit 31 may display only a part of the character (e.g., the hat or the clothes of character represented by the tag 2 may be attached to another character). Alternatively, in the case where the application program that is being executed is a specific application program, the application unit 31 may display the character represented by the tag 2 on the display unit 17 in a normal display manner. By contrast, in the case where the application program that is being executed is a non-specific application program, the application unit 31 may display the character in a display manner different from the normal display manner (e.g., display the character as a two heads high figure).

In step S47, the application unit 31 notifies the user that the tag 2 is not usable in (does not correspond to) the application program that is being executed.

After step S46 or S47, the application unit 31 executes the process of step S1 again. After this, the series of processes shown in FIG. 12 are repeated until a condition for terminating the game is fulfilled (e.g., until the user issues an instruction to terminate the game).

(2-5: Process Example 2 by the Application Program)

Figure 13:
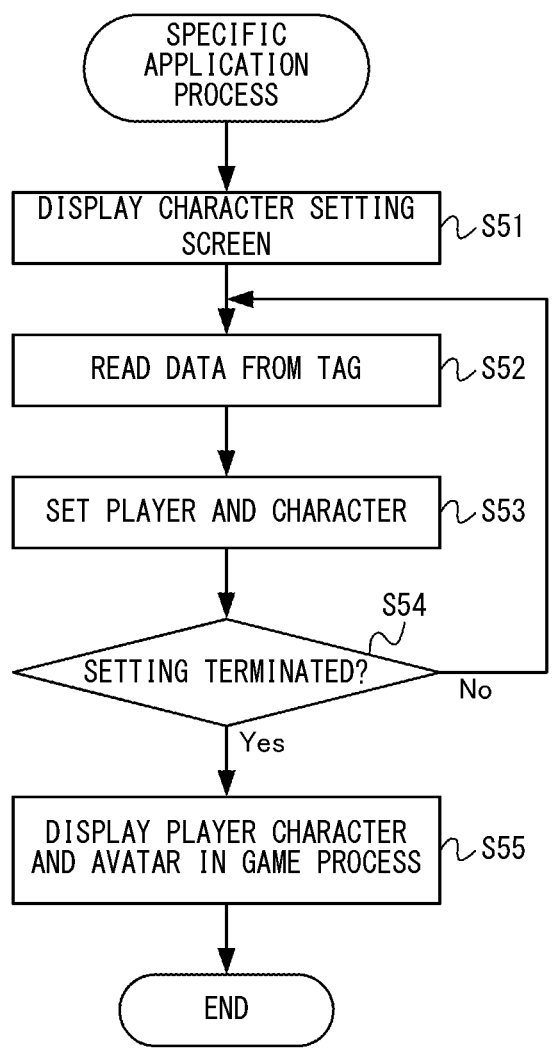
FIG. 13 is a flowchart showing an example of flow of a process executed by the CPU by a specific application program (specific application process)
Figure 15:
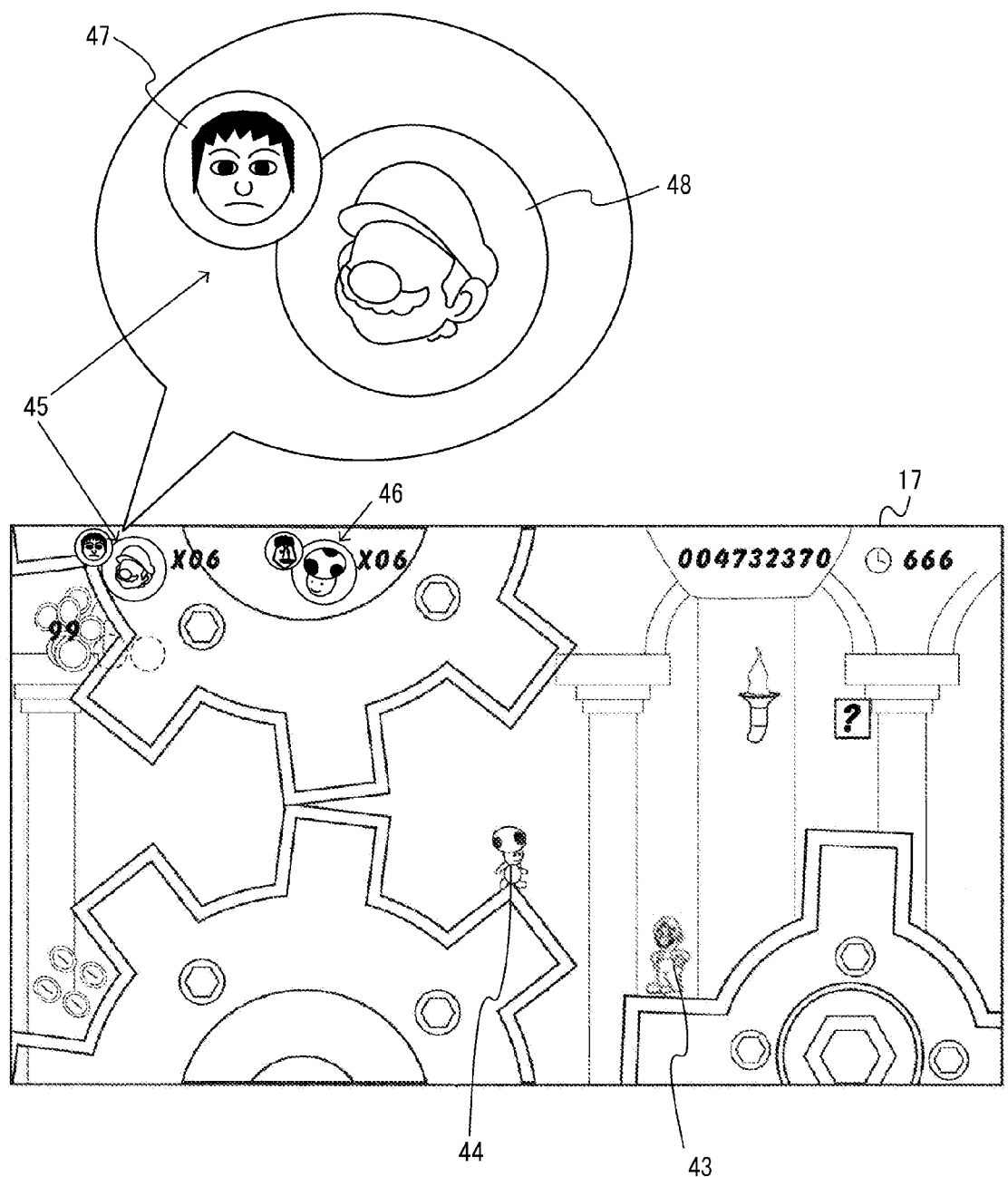
FIG. 15 shows an example of game image displayed on a display unit by the specific application process.
Figure 16:
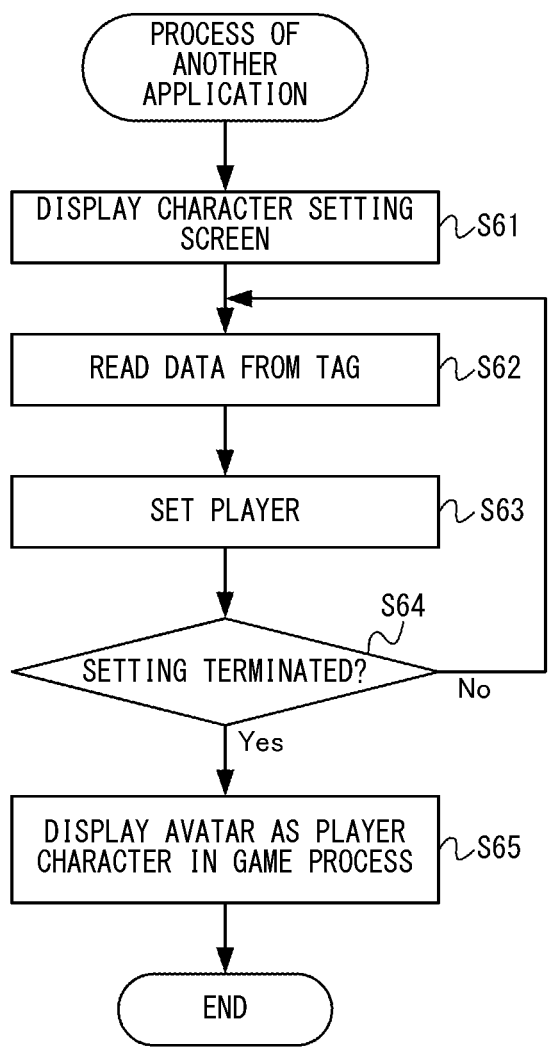
FIG. 16 is a flowchart showing an example of flow of a process executed by the CPU by an application program different from the specific application program (process of another application)

Now, with reference to FIG. 13 through FIG. 17, other examples of processes executed by the CPU 13 (application unit 31) of the information processing device 3 in accordance with application programs will be described. FIG. 13 is a flowchart showing an example of flow of a process executed by the CPU 13 in accordance with a specific application program (specific application process). FIG. 16 is a flowchart showing an example of flow of a process executed by the CPU 13 in accordance with an application program different from the specific application program (process of another application). Hereinafter, a case where a single tag 2 is used in a game executed by the specific application program and also in a game executed by another application program will be described. The processes shown in FIG. 13 and FIG. 16 are each started in response to, for example, the user issuing an instruction to start the application.

First, with reference to FIG. 13 through FIG. 15, the specific application process will be described. The specific application process is executed as follows. First, in step S51, the application unit 31 displays a character setting screen on the display unit 17. The character setting screen is for setting a player character operated by the user (player). As described later in detail, in the specific application process, a pair of the avatar of the player and the player character is displayed in the character setting screen (see FIG. 14).

In the specific application process shown in FIG. 13, the player character is specified by use of the tag. Namely, in the state where the character setting screen is displayed, the user holds the tag of the character he/she wishes to operate against the information processing device 3 (antenna part of the information processing device) to cause the tag and the information processing device 3 to perform near field communication therebetween. The tag has the initial registration process already executed thereon and has the avatar data of the user stored thereon. When the near field communication between the information processing device 3 and the tag is made possible, the information processing device 3 reads data from the tag, and sets the user corresponding to the avatar data read from the tag as the player and also sets the character of the tag as the player character of the player. In this manner, the pair of the player and the player character is set. In the specific application process in the example embodiment, the above-described process of setting the pair of the player and the player character is executed in steps S52 and S53.

This will be described more specifically. In step S52, the application unit 31 executes a process of reading data from the tag. This process is substantially the same as that shown in FIG. 4 through FIG. 6. Namely, the application unit 31 transfers a read instruction to the communication control unit 32. In response to this, the communication control unit 32 executes a communication process with the tag and the like (steps S1 through S3, S5) to transfer the shared data and the dedicated data to the application unit 31. As a result, the application unit 31 can acquire (read) the data from the tag.

In step S53, the application unit 31 sets a pair of a player and a player character. Specifically, the application unit 31 sets a player based on the avatar data among the data read in step S52. Namely, the avatar data is stored on the memory 14 as data specifying the player. The application unit 31 also sets a player character based on the figure ID among the data read in step S52. Namely, the data on the figure ID among the read data is stored on the memory 14 as the data representing the player character corresponding to the player that has been set. The application unit 31 further displays the pair of the player and the player character that has been set in the character setting screen.

Figure 14:
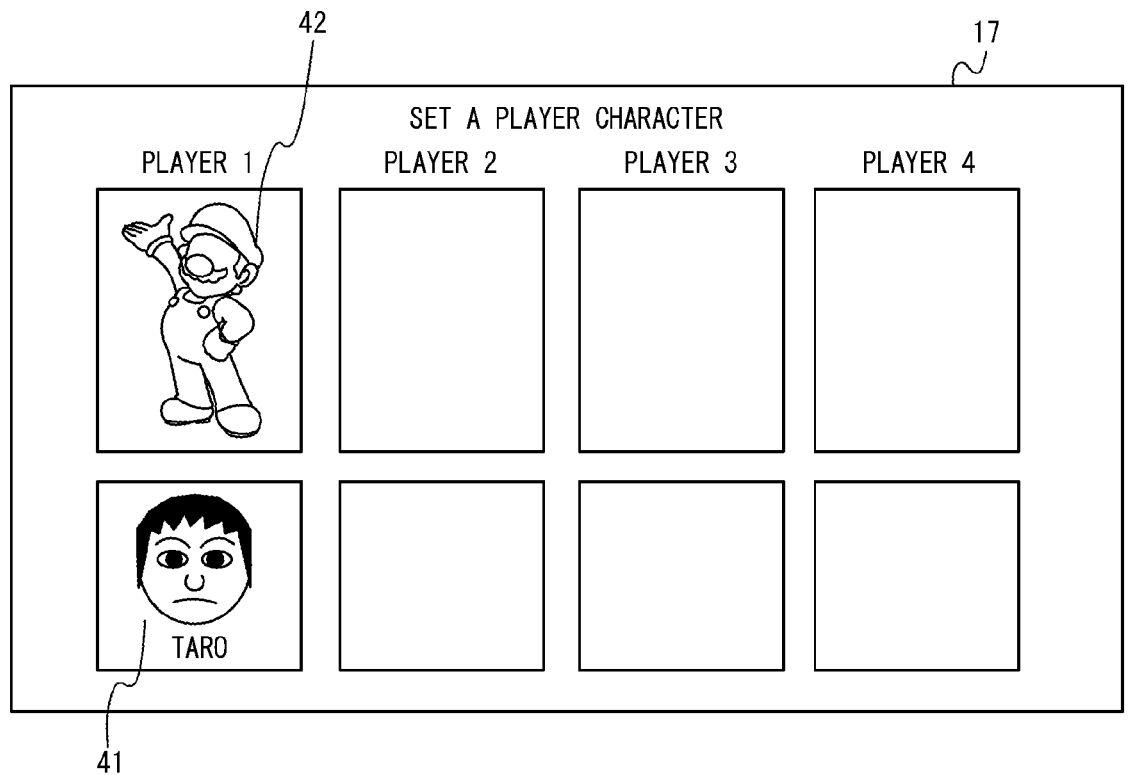
FIG. 14 shows an example of character setting screen in the specific application process.

FIG. 14 shows an example of character setting screen in the specific application process. As shown in FIG. 14, in the character setting screen, an image 41 of the avatar of the player and an image 42 of the player character are displayed as being associated with each other. FIG. 14 shows the character setting screen in the state where a first player and his/her player character are set by use of the tag 2. Therefore, the image 41 of the avatar and the image 42 of the player character are displayed in a field for the first player (the fields for the second and other players are blank). It is assumed that the game executable by the specific application process shown in FIG. 13 can be played by four players at the maximum. Therefore, fields for four players are set in the character setting screen.

The image 41 of the avatar is generated by use of the avatar data read from the tag 2. As described above, the avatar (image of the avatar) is generated by the CPU 13 executing an avatar generation program prepared in the information processing device 3 in advance. In the example embodiment, the entire body of the avatar can be displayed by use the avatar data and the avatar generation program. In the specific application process, an image of a part (face) of the avatar is displayed. In FIG. 14, the name of the player (in FIG. 14, "Taro") is displayed together with the image 41 of the avatar. In the case where, for example, the avatar data includes data representing the name of the user, the name displayed in the character setting screen may be the name represented by the data. In another embodiment, the name displayed in the character setting screen may be the above-described nickname included in the initial registration data.

In step S54, the application unit 31 determines whether or not to terminate the setting of the player character. In the case where, for example, the maximum number (herein, four) of player characters that can be set have been set, or in the case where the user issues an instruction to start the game, the application unit 31 determines to terminate the setting. By contrast, when the maximum number of player characters have not been set and further the user has not issued an instruction to start the game, the application unit 31 determines not to terminate the setting. In the case where the determination result in step S54 is negative, the process of step S52 is repeated. In this case, a player different from the player who has already set his/her player character holds his/her tag against the information processing device 31, and a new pair of the player and a player character is set by the processes of steps S52 and S53. By contrast, in the case where the determination result in step S54 is positive, a process of step S55 is executed.

In step S55, the application unit 31 executes a game process. The content of the game played by the game process is optional. In the example embodiment, the correspondence between the players (avatars of the players) and the player characters is displayed even during the game. FIG. 15 shows an example of game image displayed on the display unit 17 by the specific application process. The game image shown in FIG. 15 displays a case where two players play the game. Namely, in the game image, a game space in which a first player character 43 and a second player character 44 appear is shown. The game image includes images 45 and 46 each showing the correspondence between a player (avatar of the player) and a player character. FIG. 15 shows the game image displayed on the display unit 17 and also shows the image 45 that is enlarged. The image 45 includes an image 47 of the avatar and an image 48 of the player character, and shows the image 47 of the avatar and the image 48 of the player character in the state where the image 47 the image 48 are associated with each other. As shown in the images 45 and 46, the image of the avatar and the image of the player character are displayed as being associated with each other regarding each of the player-player character pairs.

The above-described game process is executed until a condition for terminating the game (e.g., the user issues an instruction to terminate the game) is fulfilled. When the condition is fulfilled, the application unit 31 terminates the game and terminates the specific application process.

According to the specific application process, the user can easily set the player character in the game by an operation of holding the tag 2 against the information processing device 3. Also according to the specific application process, the player character and the player (avatar of the player) are displayed as being associated with each other (see FIG. 14 and FIG. 15). Owing to this, each player can easily recognize the player character operated by himself/herself.

Now, with reference to FIG. 16 and FIG. 17, the process of the another application will be described. The process of the another application is executed as follows. First in step S61, the application unit 31 displays a character setting screen on the display unit 17. As described late in detail, in the process of the another application, an avatar of a player is set as a player character, and an image of the avatar is displayed in the character setting screen (see FIG. 17).

In the process of the another application shown in FIG. 16, like in the specific application process described above, the player character is specified by use of the tag. Namely, in the state where the character setting screen is displayed, the user holds the tag storing data of his/her avatar against the information processing device 3 (antenna part of the information processing device) to cause the tag and the information processing device 3 to perform near field communication therebetween. When the near field communication between the information processing device 3 and the tag is made possible, the information processing device 3 reads data from the tag, generates an avatar by use of the data read from the tag, and sets the avatar as the player. In the process of the another application in the example embodiment, the above-described process of setting the player character is executed in steps S62 and S63.

In step S62, the application unit 31 executes a process of reading data from the tag. The process of step S62 is substantially the same as that of step S52.

In step S63, the application unit 31 sets a player character based on the avatar data read in step S62. Specifically, the application unit 31 acquires information for identifying the avatar (e.g., name of the avatar) from the avatar data read in step S62 and stores the information for identifying the avatar on the memory 14 as the data representing the player character. The application unit 31 also displays the player character that has been set in the character setting screen.

Figure 17:
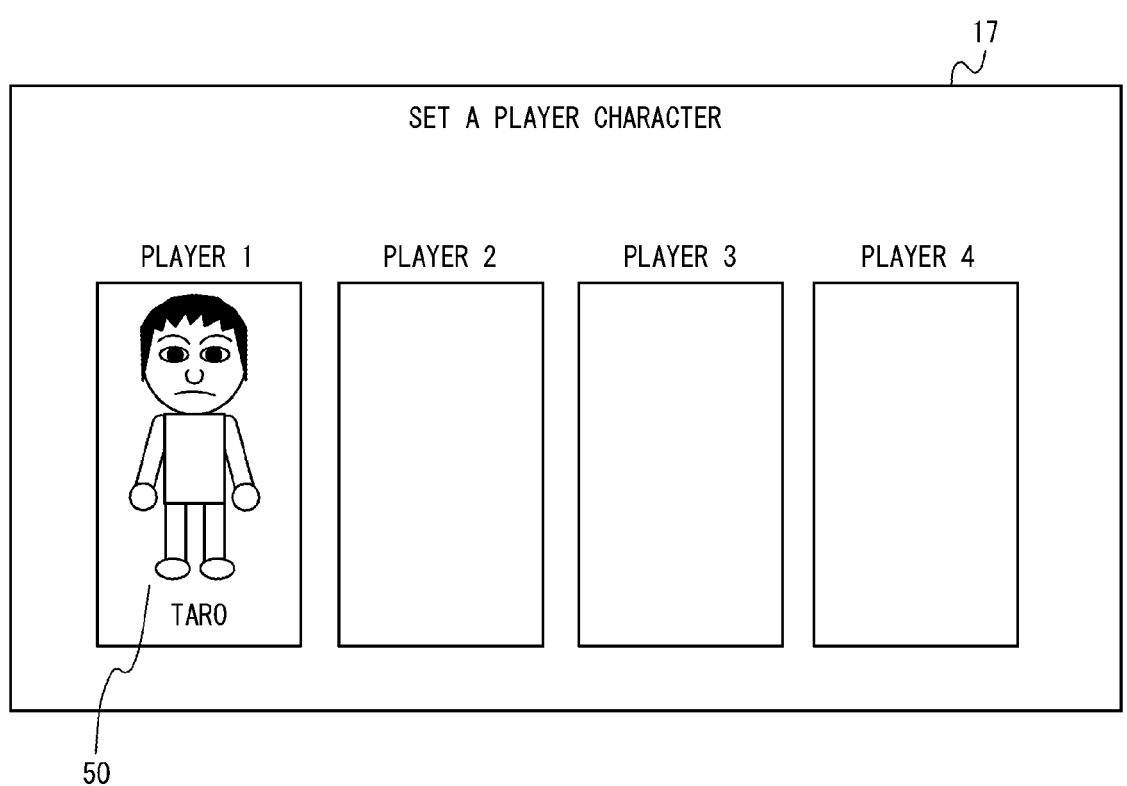
FIG. 17 shows an example of character setting screen in the process of the another application.

FIG. 17 shows an example of character setting screen in the process of the another application. As shown in FIG. 17, in the character setting screen, an image 50 of the avatar of the player, which is the player character, is displayed. FIG. 17 shows the character setting screen in the state where the player character of a first player is set by use of the tag 2.

Therefore, the image 50 of the avatar is displayed in a field for the first player (the fields for the second and other players are blank). It is assumed that the game executable by the process of the another application shown in FIG. 16 can be played by four players at the maximum. Therefore, fields for four players are set in the character setting screen.

The image 50 of the avatar is generated by use of the avatar data read from the tag 2 by the execution of an avatar generation program prepared in the information processing device 3 in advance like in the specific application process. In the process of the another application, the avatar is displayed in a display manner different from that in the specific application process. Namely, in the process of the another application, the entire body of the avatar is displayed. In the process of the another process, like in the specific application process, the name of the player (in FIG. 17, "Taro") is displayed together with the image 50 of the avatar.

In step S64, the application unit 31 determines whether or not to terminate the setting of the player character. The determination in step S64 may be made by substantially the same method as in step S54. In the case where the determination result in step S64 is negative, the process of step S62 is repeated. In this case, a player different from the player who has already set his/her player character holds his/her tag against the information processing device 31, and a player character of the player, namely, a new player character, is set by the processes of steps S62 and S63. By contrast, in the case where the determination result in step S64 is positive, a process of step S65 is executed.

In step S65, the application unit 31 executes a game process. The content of the game played by the game process is optional. In the example embodiment, during the game, the player character, which is an avatar, appears and is controlled by the operation of the player. The above-described game process is executed until a condition for terminating the game (e.g., the user issues an instruction to terminate the game) is fulfilled. When the condition is fulfilled, the application unit 31 terminates the game and terminates the specific application process.

In another embodiment, in the process of the another application, the application unit 31 may display the character represented by the tag 2 and the avatar data (player information) stored on the tag 2 in the state where the character and the avatar data are associated with each other, like in the specific application process. For example, the application unit 31 may cause an avatar dressed like the character represented by the tag 2 to appear as a player character. In the case where, for example, the tag 2 has an external appearance representing an item, the application unit 31 may cause the avatar to appear as a player character and have the player character carry the item represented by the tag 2.

According to the process of the another application, the user can easily set the player character in the game (more specifically, set his/her avatar as the player character) by an operation of holding the tag 2 against the information processing device 3. By setting the avatar as the player character, each player can easily recognize the player character operated by himself/herself. According to the process of the another application in the example embodiment, a single tag 2 is usable to cause a player character different from that in the specific application process to appear.

In the process of the another application, in one application program (a specific application program or another application program), the character represented by the tag, and also the avatar, may appear in the game space. For example, a case in which a first tag representing a character and a second tag representing an avatar are prepared will be discussed. The second tag does not represent any specific avatar, but represents a general appearance of an avatar; for example, represents only a profile of the face and the body with no further details (eyes, nose, mouth). The second tag stores avatar data and also stores, as a figure ID, information representing that the character is an avatar (information representing that the character to appear in the game space is an avatar). In the case where near field communication is performed between the first tag and the information processing device 3 and an application is executed by use of the first tag, the information processing device 3 causes a character represented by the first tag to appear in the virtual space (e.g., as a player character). By contrast, in the case where near field communication is performed between the second tag and the information processing device 3 and an application is executed by use of the second tag, the information processing device 3 generates an avatar by use of the avatar data stored on the second tag and causes the avatar to appear in the virtual space (e.g., as a player character). In the above, the application program may correspond only to the second tag and may not correspond to the first tag (no character represented by the first tag may appear).

In the example embodiment, the avatar data can be stored on the tag 2, so that the avatar data can be transferred between information processing devices by use of the tag 2 (via the tag 2) (the transfer may be mere transfer of the data, copying of the data, or exchange of the data). Namely, after an information processing device stores avatar data on the tag 2 (see the registration instruction process described above), another information processing device can acquire the avatar data by reading the data from the tag 2 by near field communication. For example, the user can store avatar data on his/her tag and, when visiting his/her friend, cause the friends information processing device to acquire the data from the user's tag. Thus, the user's avatar data can be stored on the friends information processing device.

The transfer of the data on the user such as avatar data or the like between information processing devices may be performed another method in addition to (or instead of) the above-described method. In the case where, for example, the information processing devices each include a network communication unit for performing network communication via a network such as the Internet or the like, the data may be transmitted or received between the information processing devices via the network communication. In the case where the information processing devices each include a wireless communication unit for performing wireless communication such as infrared communication, Bluetooth (registered trademark) communication or the like, the data may be directly transmitted or received between the information processing devices by the wireless communication. In the case where the near field communication is possible between the information processing devices, the data may be transmitted or received between the information processing devices by the near field communication. In the case where the information processing device that is to acquire the data includes a camera (unit for reading a two-dimensional barcode), the data may be transmitted or received between the information processing devices by use of the two-dimensional barcode. Specifically, one of the information processing devices may generate a two-dimensional barcode representing the avatar data, and the other information processing device may read the two-dimensional barcode to acquire the avatar data. According to the method using the tag as in the example embodiment, the user can transfer the data by a simple operation of holding a tag against the information processing device.

3. Functions and Effects of the Example Embodiment

As described above, in the example embodiment, the tag 2 includes a storage unit that stores application data that is usable in a specific application program (dedicated data) and shared data usable in an application program regardless of whether or not the application program is a specific application program. The communication control unit 32 accepts an instruction regarding data read/write from/to the tag 2 from the application program to be executed by the information processing device 3. In the case where the accepted instruction is regarding the dedicated data (e.g., instruction to read the dedicated data), under the condition that the instruction is from a specific application program (step S5: Yes), the communication control unit 32 transfers the dedicated data read from the tag 2 to the specific application program (step S6). In the case where the accepted instruction is regarding the shared data (e.g., instruction to read the shared data), the communication control unit 32 transfers the shared data read from the tag 2 to the specific application program that issued the instruction regardless of whether or not the instruction is from a specific application program (steps S6, S7).

Therefore, according to the example embodiment, the tag 2 is usable to use the dedicated data in the specific application program, and is also usable to use the shared data in an application program that is not limited to the specific application program. Owing to this, the number of applications that can use the tag 2 is increased, and thus the tag 2 can be used in a more versatile manner. The shared data is usable in another application program other than the specific application program as well as in the specific application program, whereas the dedicated data can be restricted from being used in the another application program. Therefore, fraudulent use of the dedicated data in the another application program can be prevented.

In the example embodiment, the tag 2 stores the identification information set for each type of tag (figure ID). The specific application program includes the figure ID set for the tag that stores the dedicated data usable in the specific application program itself. The communication control unit 32 determines whether or not the accepted instruction is from the specific application program based on the figure ID read from the tag 2 and the figure ID acquired from the application program. Owing to this, it can be determined easily whether or not the accepted instruction is from the specific application program.

For making the above-described determination by use of the figure ID, the specific application program may access only a predetermined type of tag among the tags usable in the specific application program itself. Namely, the specific application program may transmit, to the communication control unit 32, the figure IDs of all the tags usable in the application program itself, so that the specific application program can access an optional tag usable in the specific application program itself. Alternatively, the application program may transmit, to the communication control unit 32, a part of the figure IDs of the tags usable in the application program itself, so that the specific application program can limit the tag(s) accessible by the specific application program itself among the tags usable in the specific application program itself. In this manner, for executing the specific application/non-specific application determination process by use of the figure ID, it can be determined whether or not the tag connected to the information processing device 3 is permitted to be accessed by the specific application program, in addition to determining whether or not the application program that has issued the instruction is a specific application program.

In the example embodiment, the tag 2 stores the shared data that is on the object (character) appearing in a predetermined application program (specific application program) and is usable in the specific application program or a non-specific application program. For executing the specific application program, the information processing device 3 uses the shared data read from the tag 2 and thus executes a first process of displaying the object on the display unit 17 (process of displaying the entirety of the character) (step S46). For executing an application program that is not the specific application program (non-specific application program), the information processing device 3 uses the shared data read from the tag 2 and thus executes a second process different from the first process (executes a process of displaying another character wearing the clothes of the above character) (step S46).

According to the above, the tag 2 is usable to use the shared data in the predetermined application program and also in another application program. Owing to this, the number of applications that can use the tag 2 is increased, and thus the tag 2 can be used in a more versatile manner.

The first process and the second process are not limited to being a process of displaying an object, and may be an optional process of outputting information on the object. The information on the object may be, for example, an image representing the object, or a sound on the object (voice or theme tune of the character). In the case where, for example, a theme tune is set for the character represented by the tag 2, the first process and/or the second process may be a process of outputting the theme tune from the speaker (e.g. as BGM).

When near field communication is made possible between the communication control unit 32 and a certain tag 2, the communication control unit 32 determines whether or not the tag is a permitted tag, an access to which by the application program to be executed by the information processing device 3 is permitted (step S3). In the case where it is determined that the tag with which near field communication is made possible is a permitted tag, the communication control unit 32 executes a process in conformity to the instruction (read instruction, etc.) from the application program to be executed by the information processing device 3 (steps S6, S7). In other words, the communication control unit 32 permits the shared data to be used in the application program to be executed by the information processing device 3 under the condition that the tag with which near field communication is made possible is a permitted tag. Owing to this, data on the permitted tag is usable in another application program different from the specific application program, whereas the another application program can be prevented from reading data from a tag that is not a permitted tag.

In the example embodiment, the information processing device 3 executes, as the second process, a process of displaying an object (character) displayed in the first process in a manner different from in the first process (e.g., displays only a part of the object, or displays the object as a two heads high figure) (step S46). Owing to this, the object can be displayed in a display manner suitable to the application, and thus the versatility of the tag (versatility of the data stored on the tag) can be further improved.

In another embodiment, when executing a game application program different from the predetermined application program (non-specific application program), the information processing device 3 may execute a process that does not influence the progress of the game as the second process. For example, as described in the above embodiment, the information processing device 3 may execute a process of changing only the appearance of a character different from the character represented by the tag 2 (e.g., changing the clothes) but not changing a game parameter that influences the progress of the game (e.g., parameter of the strength of the character, etc.). As can be seen, the second process may use the shared data in a supplementary manner unlike the first process. This allows a developer of the application program to make the shared data usable in a more versatile manner in the second process, and thus the versatility of the tag is improved.

In the example embodiment, the tag 2 has an external appearance that represents, three-dimensionally (or two-dimensionally), the object (character) appearing in the virtual space that is generated by execution of a predetermined application program (specific application program) by the information processing device 3 (FIG. 2). The tag 2 stores first identification information (figure ID) on the object and second identification information (series ID) on the group to which the object belongs. The information processing device 3 uses the figure ID read from the tag 2 to execute a predetermined process (process of displaying the character represented by the figure ID (step S46)) and also uses the series ID read from the tag 2 to execute the predetermined process.

According to the above, the application program to be executed by the information processing device 3 can execute the predetermined process by use of either the figure ID or the series ID. Namely, even in the case where the figure ID is not usable (the figure ID is not registered), the series ID can be used to execute the predetermined process (as long as the series ID is registered). As can be seen, the example embodiment allows the application program to execute the predetermined process more easily and allows the tag to be used more easily by a larger number of applications. Thus, the versatility of the tag is improved.

While executing the application program, the information processing device 3 determines whether or not the figure ID read from the tag 2 represents the value registered in the application program that is being executed (step S44). The information processing device 3 also determines whether or not the series ID read from the tag 2 represents the value registered in the application program that is being executed (step S45). The predetermined process (step S46) is executed in the case where at least one of the figure ID and the series ID read from the tag 2 represents the value registered in the application program that is being executed (FIG. 12). Owing to this, as long as one of the figure ID and the series ID is registered in the application program, the application program can execute the predetermined process. This allows the tag to be used more easily by a larger number of applications. Thus, the versatility of the tag is improved.

In the example embodiment, the predetermined process is a process regarding the object (character). In the case where the figure ID read from the tag 2 represents the value registered in the application program that is being executed, the information processing device 3 specifies the object by use of the figure ID (step S46). In the case where the figure ID read from the tag 2 does not represents the value registered in the application program that is being executed (step S45: No) and the series ID read from the tag 2 represents the value registered in the application program that is being executed (S45: Yes), the information processing device 3 specifies the object by use of the series ID. Owing to this, even in the case where the figure ID is not usable, the object can be specified by use of the series ID, and the predetermined process regarding the object can be executed.

(Functions and Effects of the Application Process Shown in FIG. 13 and FIG. 16)

In the example embodiment, the tag 2 stores object information (figure ID, etc.) on an object represented by the external appearance of the tag 2 itself. The information processing device 3 writes, to the tag 2, character image information (avatar data) specifying an image of the character (avatar) created based on an instruction of the user (step S13). The information processing device 3 also executes a predetermined process (game process of steps S53, S55, S63 or S65) by use of the object information and the character image information read from the tag 2.

According to the above, information specifying the image of the user's avatar can be written to the tag having an external appearance representing an object. Then, a process is executed by use of the information on the object and the information on the avatar. Owing to this, the tag having the information on the object can be used in a larger number of uses, and thus the tag can be used in a more versatile manner. In the case where, for example, the object represented by the tag is used as a player character, the avatar of the player operating the player character can be displayed with the player character (see FIG. 14, FIG. 15) or the avatar of the player can be used as the player character (FIG. 17).

In the example embodiment, the predetermined process is executed by execution of the specific application program. In another embodiment, the predetermined process may be executed by execution of an application program that is different from the specific application program. The predetermined process may be executed by use of both of the object information and the character image information. The information processing device may execute a first process using the object information (read from the tag) and a second process of executing a process using the character image information (read from the tag).

The "tag having an external appearance representing the object that appears in the virtual space" is not limited to a tag representing one object that appears in the virtual space in detail, and may be a tag representing a general appearance of the object that appears in the virtual space. Namely, the "tag having an external appearance representing the object that appears in the virtual space" may have an external appearance representing the object to a degree at which the object is distinguishable from another object. For example, the above-described second tag representing the avatar does not represent a specific avatar but represents a general appearance of an avatar. Namely, the second tag does not need to represent each of parts of the avatar accurately but may have an external appearance representing only a profile of the face and the body with no eyes, nose or mouth. Alternatively, the second tag may have an external appearance representing each part which has a predefined standard shape. In this case, the second tag does not precisely match the avatar generated based on the avatar data but may be considered as representing a general appearance of the avatar. The concept of the "tag having an external appearance representing the object that appears in the virtual space" encompasses such a second tag.

In the example embodiment, the information processing device 3 executes, as the predetermined process, a process of displaying at least a part of the object (player character) and at least a part of the character (avatar) on the display unit 17 in the state where the part of the object and the part of the character are associated with each other (steps S53, S55). Owing to this, the relationship between the object stored on the tag and the user (character of the user) can be presented in an easy-to-understand manner. The above-described process may be a process of displaying the player character and the avatar in the character setting screen as shown in FIG. 14 in the state where the player character and the avatar are associated with each other, or may be a process of displaying the player character and the avatar during the game in the state where the player character and the avatar are associated with each other. The above-described process may be a process of, in the state where the avatar is the player character, causing the player character to appear as being dressed like the object represented by the tag or causing the player character to appear as carrying an item represented by the tag.

In the example embodiment, the object represented by the tag is the player character to be operated by the user, and the character created based on the instruction of the user is the character corresponding to the user that operates the player character. Owing to this, the tag can be used in a more versatile manner; for example, the operation of setting a pair of the player and the player character can be performed by use of the tag.

In the example embodiment, the character image information is information specifying the image of the avatar of the user (avatar data). More specifically, the information specifying the image of the avatar is information specifying an image of each of parts included in the avatar. Owing to this, the information processing device can easily generate the avatar based on such information.

In the example embodiment, the information processing device 3 executes the predetermined application program (specific application program) to execute an appearance process of causing an object that appears in the virtual space (game space) by use of the object information read from the tag (step S55). Owing to this, the user can feel as if an actual object represented by the tag appeared in the virtual space. Thus, the application can be more entertaining.

The information processing device executes another application program different from the predetermined application program (specific application program) to cause the character (avatar) to appear in the virtual space by use of the character image information (avatar data) read from the tag (step S65). Owing to this, the character (avatar) of the user stored on the tag can appear in the virtual space, and thus the application can be more entertaining. In addition, a single tag is usable to cause a different character to appear in the virtual space while the predetermined application program is being executed from while another application program is being executed (step S65).

In the example embodiment, the tag 2 stores object information on the object (figure ID, etc.) represented by the external appearance of the tag 2 itself and information on the user (avatar data). The information processing device 3 displays the object and information on the user on the display unit in the state where the object and the information on the user are associated with each other by use of the object information and the user information read from the tag 2 (steps S53, S55). Owing to this, the relationship between the object and the user (character of the user) stored on the tag can be presented in an easy-to-understand manner.

In the example embodiment, the user information is information specifying a character that is different from the object represented by the external appearance of the tag 2 and corresponds to the user (specifying the avatar). The information processing device executes another application program different from the predetermined application program (specific application program) to cause the character (avatar) specified by the user information read from the tag 2 to appear in the virtual space (step S65). Owing to this, the character (avatar) of the user stored on the tag can appear in the virtual space, and thus the application can be more entertaining. In addition, a single tag is usable to cause a different character to appear in the virtual space while the predetermined application program is being executed from while another application program is being executed.

The user information is not limited to the avatar data in the above embodiment and may be any information representing the user, for example, the name, the nickname, the figure ID or the like of the user.

4. Modification Examples

Modification Example of the Specific Application/Non-Specific Application Determination Process In the above example, the determination in the specific application/non-specific application determination process is executed by use of the figure ID. In another embodiment, the determination may be executed by use of the use ID described above. Hereinafter, a modification example in which the specific application/non-specific application determination process is executed by use of the use ID will be described.

In this modification example, for reading or writing the dedicated data from or to the tag 2, the application unit 31 first causes the use ID to be included in an instruction (read instruction, write instruction, etc.) and transmits the instruction to the communication control unit 32. Namely, the application program includes information on the use ID to be set therefor. When issuing an instruction to the communication control unit 32, the application unit 31 transfers (outputs) an instruction including the use ID to the communication control unit 32. Owing to this, the communication control unit 32 can acquire the use ID of the application program. The application unit 31 may transfer the use ID to the communication control unit 32 at an optional timing. For example, in another embodiment, the communication control unit 32 may request the application unit 31 for the use ID in the specific application/non-specific application determination process, and in response to the request, the application unit 31 may transmits the use ID to the communication control unit 32.

In another embodiment, the communication control unit 32 may specify the use ID by use of a table that associates an application ID specific to an application program (different from the use ID) and the use ID set for the application program regarding each of the application programs. Namely, the communication control unit 32 may store the table in advance, acquire the application ID together with the read instruction from the application unit 31, and determine that the use ID associated with the acquired application ID as the use ID of the application program.

In the specific application/non-specific application determination process, the communication control unit 32 compares the use ID acquired together with the instruction from the application unit 31 against the use ID read from the tag 2 in step S2. In the case where the use IDs match each other, the communication control unit 32 determines that the application program that issued the instruction is the specific application program. By contrast, in the case where the use IDs do not match each other, the communication control unit 32 determines that the application program that issued the instruction is a non-specific application program.

As in the modification example described above, the tag 2 may store at least one type of identification information specifying the specific application program that can use the dedicated data (use ID). The communication control unit 32 accepts the use ID, corresponding to the application program that issued the instruction, from this application program. The communication control unit 32 determines whether or not the accepted instruction is from the specific application program based on the use ID stored on the tag 2 and the use ID acquired from the application program that issued the instruction (step S5). Owing to this, it can be easily determined whether or not the accepted instruction is from the specific application program.

Modification Example in which a Free Data Area is Set on the Tag

In another embodiment, the tag 2 may include a free data area in addition to the data areas shown in FIG. 3 (dedicated data area, shared data area, and management data area). Hereinafter, with reference to FIG. 18, an example in which a free data area is set on the tag 2 will be described as an example of the above embodiment.

Figure 18:
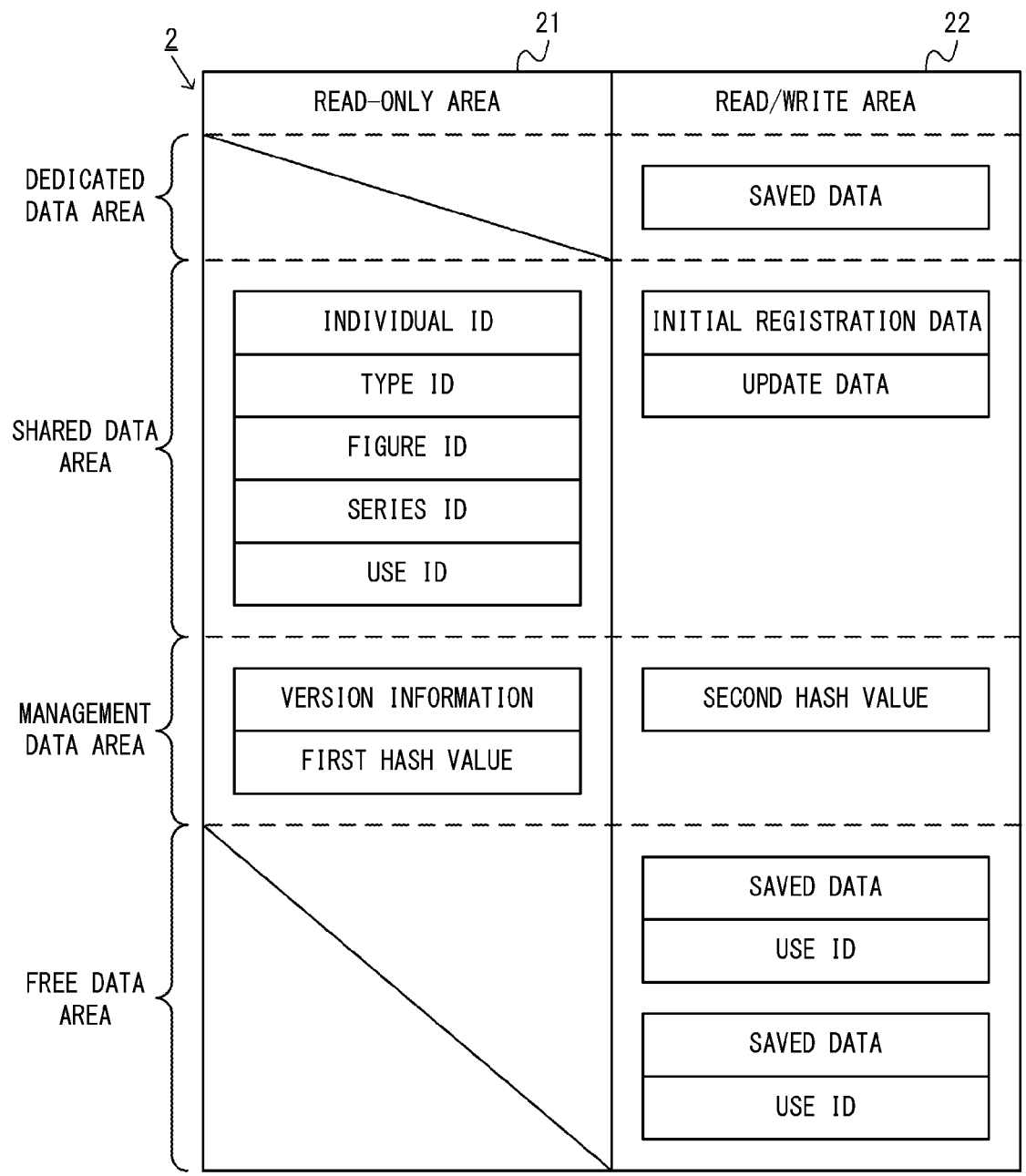
FIG. 18 shows an example of data stored on the tag in a modification example of the example embodiment.

FIG. 18 shows an example of data stored on the tag 2 in a modification example of the example embodiment. As shown in FIG. 18, in this modification example, a free data area is set in the read/write area 22 of the tag 2. The free data area is an area to which an application program other than the specific application program (non-specific application program) can write data. At the time of shipping of the tag 2, no data is basically stored in the free data area. In the case where, for example, game data is to be provided as a benefit to a user who purchases the tag, some data may be stored in the free data area.

The application unit 31 that executes a non-specific application program writes data (saved data) to the tag 2 as follows. First, the application unit 31 transmits a write instruction to the communication control unit 32. Like in the specific application/non-specific application determination process in the above modification example, the write instruction includes the use ID of the application program. In response to the write instruction, the communication control unit 32 executes processes substantially the same as those in the above embodiment (steps S1 through S6, S31) (in step S5, the communication control unit 32 executes a process substantially the same to that in the specific application/non-specific application determination process using the use ID in the above modification example). Namely, the communication control unit 32 accesses the tag 2, reads the data and transfers the read data (shared data) to the application unit 31. The application unit 31 transfers the saved data to be written to the tag 2 to the communication control unit 32.

Upon receipt of the saved data from the application unit 31, the communication control unit 32 writes the use ID acquired together with the write instruction and the received saved data to the tag 2 in the state where the use ID and the saved data are associated with each other (FIG. 18). In the tag 2, the data to be written and the use ID may be associated with each other in an optional method. For example, a method by which the free data area is managed as being divided into a plurality of blocks may be used. One block includes a data area to which the saved data is to be written and an ID area to which the use ID of the application program corresponding to the saved data is to be written. The communication control unit 32 writes the saved data to the data area of one block and also writes the use ID to the ID area of the block. As a result, the saved data and the use ID are stored as being associated with each other. Depending on the data size of the saved data, the communication control unit 32 may write the data to two or more blocks. In this case, the same use ID is written to the ID area of each of the blocks to which the saved data is written.

In this modification example also, the update data may be updated at the timing when the saved data is written, like in the above embodiment.

The application unit 31 that executes a non-specific application program reads the saved data from the tag 2 as follows. The application unit 31 transmits a read instruction to the communication control unit 32. Like in the above modification example, the read instruction includes the use ID of the application program. In response to the read instruction, the communication control unit 32 executes processes substantially the same as those of steps S1 through S4.

In this modification example, in the case where it is determined that the tag 2 is not a permitted tag in the access permission/non-permission determination process of step S3 in the above embodiment, the communication control unit 32 executes the following determination process as the specific application/non-specific application determination process of step S5. The communication control unit 32 determines whether or not the use ID included in the read instruction matches the use ID stored in the free data area of the tag 2. The determination process is executed in order to determine whether or not the application program that issued the read instruction is the application program corresponding to the saved data in the free data area of the tag 2.

It is determined that the two use IDs match each other in the determination process, the communication control unit 32 transfers the shared data and the saved data stored in association with the matching use IDs to the application unit 31. Owing to this, the application program that wrote the saved data to the free data area of the tag 2 can read the saved data from the tag 2. By contrast, in the case where the two use IDs do not match each other, the communication control unit 32 transfers the shared data (only the shared data) to the application unit 31.

As described above, in another embodiment, an application program other than the specific application program may be allowed to write the data to the tag 2. Namely, the tag 2 may include a storage area (dedicated data area) from/to which data can be read/written by the predetermined application program (specific application program), a storage area (shared data area) from which data can be read by an application program regardless of whether or not the application program is the predetermined application program, and a storage data (free data area) to which data can be written by an application program regardless of whether or not the application program is the predetermined application program. Owing to this, the number of types of application programs that can write data to the tag 2 is increased. Thus, the versatility and the convenience of the tag 2 can be further improved.

In the above modification example, the communication control unit 32 writes data to the free data area of the tag 2 in response to an instruction to the application program as follows. The communication control unit 32 stores the data to be written and the use ID of the application program on the tag 2 in the state where the data and the use ID are associated with each other. When accepting, from the application program, a read instruction on the data stored in the free data area, the communication control unit 32 determines whether or not to transfer the data to the application program based on the use ID included in the accepted read instruction and the use ID that is associated, with the data to be read, in the free data area of the tag 2. Owing to this, the data stored in the free data area of the tag 2 can be managed to be read by the application programs corresponding to the data (application program that wrote the data and application program for which the same use ID as that of the former application program is set).

In the above modification example, the data (and the use ID) written to the free data area may be allowed to be deleted by the information processing device 3. For example, in response to an instruction from the system application program that received a delete instruction, the communication control unit 32 may delete the data indicated by the delete instruction from the tag 2. Owing to this, even when the free data area of the tag 2 becomes full, a new free area can be generated so that another piece of data can be written. In another embodiment, the tag 2 may store information indicating whether or not the data stored in the free data area can be deleted, in the state where the information is associated with the data.

Modification Example Regarding the External Appearance of the Tag

In the above embodiment, the tag 2 is a figure-type tag that represents a character three-dimensionally. The shape of the tag is not limited to this, and the tag may have an optional shape. For example, the tag 2 may be a card-type tag on which a picture of the character is drawn (tag which represents the character two-dimensionally). As can be seen, the tag may have an external appearance that represents, three-dimensionally or two-dimensionally, an object that appears in a predetermined application program (in other words, an object represented by the data stored on the tag (dedicated data and/or shared data)). Owing to this, an object that can be cause to appear in an application by use of the tag 2 is recognizable by the user in an easy-to-understand manner. In the case where the object is displayed on the display unit 17, the user feels as if a real object appeared in the virtual space. Thus, the application can be more entertaining.

Modification Example Regarding the Shared Data

In the above embodiment, FIG. 3 shows an example of data included in the shared data. The data included in the shared data is optional. In another embodiment, the initial registration data may include data on a message input by the user. The message is, for example, read by the application program executed by the information processing device 3 and displayed on the display unit 17.

For example, the initial registration data may include identification information on the user of the information processing device 3. The identification information on the user is, for example, a user ID on a network service using the information processing device 3 (e.g., service providing an application via a network). When, for example, the user accesses an information processing device available outside his/her house by use of a tag, the information processing device reads the ID of the user from the tag and notifies the server that the user accessed the information processing device. In this manner, the server can manage the information processing device accessed by the user by use of the tag. For example, an information processing device may be installed at the venue of an event. When the user accesses the information processing device by use of the tag, the server learns that the user is participated in the event. For example, the server may provide the user with a predetermined service or benefit on the network service in response to the notification from the information processing device.

In the above embodiment, the update data includes information regarding the write to the tag 2 (number of times of write, last-write device, number of times of device change, last-used application, and last-write date/time). In another embodiment, the update data may include information on the read from the tag 2. For example, the update data may include information such as the number of times of data read from the tag 2 (number of times the tag has been accessed), the information processing device that read data from the tag 2 most recently, the number of times the information processing device that read the data has been changed, the application program that read data from the tag 2 most recently, the date/time when the data read from the tag 2 was performed most recently, and/or the like.

In the above embodiment, information on the most recent write to the tag 2 (last-write device, last-used application, and last-write date/time) is included in the update data. In another embodiment, the update data may include information on the history of the data write to the tag 2. For example, the update data may include information on the history of the information processing devices that wrote data to the tag 2 (the data may be dedicated data), the history of the application programs that wrote data to the tag 2 (the data may be dedicated data), and/or the history of the date/time when the data was written to the tag 2 (the data may be dedicated data). In still another embodiment, information on the history of the data read from the tag 2 may be included in the update data.

For example, in another embodiment, the information processing devices that wrote data to the tag 2 may be managed as being divided into a "home" information processing device and an "away" information processing device, by use of the update data. The "home" information processing device is the information processing device that wrote the initial registration data, and is typically the information processing device possessed by the user. The "away" information processing device is an information processing device other than the "home" information processing device, and is typically an information processing device possessed by a friend of the user or an information processing device installed in a store or at a venue of an event. The update data may include the number of times of write made by the "home" information processing device and the number of times of write made by the "away" information processing device. Owing to this, an information process suitable to the state of use of the "home" information processing device and the "away" information processing device can be executed.

In another embodiment, the update data may include flag data that is set "ON" when a predetermined condition is fulfilled. The predetermined condition is that, for example, a specific information processing device installed in a store or at a venue of an event accesses the tag. Namely, the flag data stored on the tag 2 is updated to a value representing "ON" by the specific information processing device. Owing to this, information indicating that the user visited the store or the event is stored on the tag. Therefore, the application program can execute a process using such information (e.g., process of providing a benefit to the user who visited a specific event).

Modification Example Regarding the Structure of the Information Processing System In another embodiment, in the case where the tag 2 includes an information processing unit, a part of the process which would otherwise be executed by the information processing device 3 may be executed on the tag 2 side. For example, the process which would otherwise be executed by the communication control unit 32 (a part of, or the entirety of, the process) may be executed by the information processing unit of the tag 2. In the above embodiment, the communication control unit 32 actually reads dedicated data from the tag 2 and manages the transfer of the dedicated data to the application unit 31, and thus the read of the dedicated data from the tag 2 by the application unit 31 is restricted. By contrast, in the case where the process which would otherwise be executed by the communication control unit 32 is executed on the tag 2 side, the read of the dedicated data from the tag 2 by the information processing device 3 is literally restricted.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

The example embodiment is usable as, for example, a game device or a game system for executing a game application or the like or a storage device or the like storing game data for the purpose of, for example, using a storage device in a more versatile manner.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system, comprising:
a storage device having an external appearance that represents an object that appears in a game; and
an information processing device for performing near field communication with the storage device;
wherein:
the storage device stores object information on the object;
at least one processor included in the information processing device executes:
writing avatar information representing an avatar created by a user of the information processing system to the storage device; and
displaying the object and the avatar in the state where the object and the avatar are associated with each other using the object information and the avatar information stored on the storage device;
the avatar registered in the information processing device by the user of the information processing device is written to the storage device; and
said avatar information is not stored into the storage device at the time of production of the storage device.

2. An information processing system, comprising:
a storage device; and
an information processing device for performing near field communication with the storage device;
wherein:
the storage device:
has an external appearance representing, three-dimensionally or two-dimensionally, an object that appears in a virtual space generated by execution of a predetermined application program by the information processing device; and
stores object information on the object; and
at least one processor included in the information processing device executes:
writing, to the storage device, character image information specifying an image of an avatar created by a user of the information processing system based on an instruction of a user; and
executing a predetermined process using at least one of the object information and the character image information read from the storage device;
the avatar registered in the information processing device by the user of the information processing device is written to the storage device; and
the character image information specifying an image of an avatar created by the user is not stored into the storage device at the time of production of the storage device.

3. The information processing system according to claim 2, wherein the processor executes, as the predetermined process, a process of displaying at least a part of the object and at least a part of the character on a display unit in the state where the part of the object and the part of the character are associated with each other.

4. The information processing system according to claim 2, wherein the object information is stored on a storage unit in advance at the time of production of the storage device.

5. The information processing system according to claim 2, wherein:

the object is a player character to be operated by the user; and
the character corresponds to the user that operates the player character.

6. The information processing system according to claim 2, wherein the processor writes, to the storage device, information specifying an image of an avatar of the user as the character image information.

7. The information processing system according to claim 6, wherein the information specifying the image of the avatar is information specifying an image of each of parts included in the avatar.

8. The information processing system according to claim 2, wherein the storage device stores identification information on the object as the object information.

9. The information processing system according to claim 2, wherein the processor executes the predetermined application program to execute, as the predetermined process, an appearance process of causing the object that appears in the virtual space using the object information read from the storage device.

10. The information processing system according to claim 9, wherein the processor executes another application program different from the predetermined application program to further execute a process of causing the character to appear in the virtual space using the character image information read from the storage device.

11. An information processing device for performing near field communication with a storage device; wherein
the storage device:
has an external appearance representing, three-dimensionally or two-dimensionally, an object that appears in a virtual space generated by execution of a predetermined application program by the information processing device; and
stores object information on the object; and
at least one processor included in the information processing device executes:
acquiring character image information that specifies an image of an avatar created by a user of the information processing system based on an instruction of a user and is used in a predetermined process in an application program executable by the information processing device; and
writing the acquired character image information to the storage device;
the avatar registered in the information processing device by the user of the information processing device is written to the storage device; and
the character image information that specifies an image of an avatar created by the user is not stored into the storage device at the time of production of the storage device.

12. A non-transitory computer-readable storage medium storing an information processing program executable by a computer of an information processing device for performing near field communication with a storage device, wherein:
the storage device
has an external appearance representing, three-dimensionally or two-dimensionally, an object that appears in a virtual space generated by execution of a predetermined application program by the information processing device; and
stores object information on the object; and
the information processing program causes the computer to execute:

acquiring character image information that specifies an image of an avatar created by a user of the information processing system based on an instruction of a user and is used in a predetermined process in an application program executable by the information processing device; and writing the acquired character image information to the storage device;

the avatar registered in the information processing device by the user of the information processing device is written to the storage device; and the character image information that specifies an image of an avatar created by the user is not stored into the storage device at the time of production of the storage device.

13. An information processing method executable by an information processing system including a storage device and an information processing device for performing near field communication with the storage device, wherein:

the storage device:
has an external appearance representing, three-dimensionally or two-dimensionally, an object that appears in a virtual space generated by execution of a predetermined application program by the information processing device; and stores object information on the object; and the information processing device:
writes, to the storage device, character image information specifying an image of an avatar created by a user of the information processing system based on an instruction of a user; and executes a predetermined process using at least one of the object information and the character image information read from the storage device;

the avatar registered in the information processing device by the user of the information processing device is written to the storage device; and the character image information specifying an image of an avatar created by the user is not stored into the storage device at the time of production of the storage device.

14. A storage device for performing near field communication with an information processing device; wherein the storage device:

has an external appearance representing, three-dimensionally or two-dimensionally, an object that appears in a virtual space generated by execution of a predetermined application program by the information processing device; and includes:
an object information storage area that stores object information on the object;
a character image information storage area that stores character image information specifying an image of an avatar created by a user of the information processing system based on an instruction of a user;

wherein:
the avatar registered in the information processing device by the user of the information processing device is written to the storage device; and
the character image information specifying an image of an avatar created by the user is not stored into the storage device at the time of production of the storage device.

* * * * *